(12) United States Patent
Ito et al.

(10) Patent No.: US 8,306,930 B2
(45) Date of Patent: *Nov. 6, 2012

(54) LEARNING DEVICE, LEARNING METHOD, AND PROGRAM FOR LEARNING A PATTERN

(75) Inventors: Masato Ito, Tokyo (JP); Kazumi Aoyama, Saitama (JP); Kuniaki Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 657 days.

This patent is subject to a terminal disclaimer.

(21) Appl. No.: 12/498,718

(22) Filed: Jul. 7, 2009

(65) Prior Publication Data

US 2010/0010948 A1    Jan. 14, 2010

(30) Foreign Application Priority Data

Jul. 9, 2008    (JP) ................................ P2008-178805

(51) Int. Cl.
*G06G 7/00*    (2006.01)

(52) U.S. Cl. ........................................... 706/20

(58) Field of Classification Search .......................... None
See application file for complete search history.

(56) References Cited

FOREIGN PATENT DOCUMENTS

| JP | 2002-024795 | 1/2002 |
|----|-------------|--------|
| JP | 2002-24795  | 1/2002 |

OTHER PUBLICATIONS

Sugita et al., "Learning Semantic Combinatoriality from the Interaction between Linguistic and Behavioral Processes", Adaptive Behavior, vol. 13, No. 1, 33-52 (2005).*

Tani, "On the Interactions Between Top-Down Anticipation and Bottom-Up Regression", Nov. 2007, Frontiers in Neurorobotics, vol. 1, pp. 1-10.*

Xia et al, "A Cooperative Recurrent Neural Network Algorithm for Parameter Estimation of Autoregressive Signals", Oct. 2006, Neural Networks, pp. 2516-2522.*

Ito et al., "Dynamic Generation and Switching of Object Handling Behaviors by Humanoid Robot using a Recurrent Neural Network Model", 2006, Neural Networks, pp. 323-337.*

Japanese Patent Office, Notification of Reasons for Refusal for Japanese Patent Application No. 2008-178805, drafted Jun. 2, 2010.

Eiji Watanabe et al., "A Cooperative Learning Algorithm for Multi-Layered Neural Networks by using a PC Cluster", Technical Report, Department of Information Systems and Management Science, Faculty of Science, Korean University, Nov. 17, 2000.

Yuuya Sugita, "Learning Semantic Combinatoriality from the Interaction between Linguistic and Behavioral Processes", Adaptive Behavior, pp. 1-26, 2005.

Y. Sugita et al., "Learning Semantic Combinatoriality from the Interaction between Linguistic and Behavioral Processes", Adaptive Behavor, vol. 13, No. 1, pp. 33-52 (2005).

* cited by examiner

*Primary Examiner* — Jeffrey A Gaffin
*Assistant Examiner* — Paulinho E Smith
(74) *Attorney, Agent, or Firm* — Finnegan, Henderson, Farabow, Garrett & Dunner, L.L.P.

(57) ABSTRACT

A learning device, learning method, and program for learning a pattern are disclosed. A learning device includes: a plurality of learning modules, each of which performs update learning to update a plurality of model parameters of a pattern learning model that learns a pattern using input data; model parameter sharing means for causing two or more learning modules from among the plurality of learning modules to share the model parameters; and sharing strength updating means for updating sharing strengths between the learning modules so as to minimize learning errors when the plurality of model parameters are updated by the update learning.

8 Claims, 22 Drawing Sheets

PATTERN P#1

PATTERN P#2

PATTERN P#3

PATTERN P#4

PATTERN P#5

$\beta_{ij} = 0.3$ $\beta_{ij} = 0.1$ $\beta_{ij} = 0.01$

LEARNING DEVICE, LEARNING METHOD, AND PROGRAM FOR LEARNING A PATTERN

BACKGROUND OF THE INVENTION

1. Field of the Invention

The invention relates to a learning device, a learning method and a program and, more particularly, to a learning device, a learning method and a program that are able to obtain a pattern learning model having scalability and generalization capability.

2. Description of the Related Art

A pattern learning model that learns a pattern may be, for example, RNN (Recurrent Neural Network), RNNPB (Recurrent Neural Net with Parametric Bias), or the like. The scheme of learning of those pattern learning models is classified into a "local representation" scheme and a "distributed representation" scheme.

In the "local representation" scheme, a plurality of patterns are learned in each of a plurality of learning modules, each of which learns a pattern learning model (updates model parameters of a pattern learning model). Thus, one learning module stores one pattern.

In addition, in the "distributed representation" scheme, a plurality of patterns are learned in one learning module. Thus, one learning module stores a plurality of patterns at a time.

In the "local representation" scheme, one learning module stores one pattern, that is, one pattern learning model learns one pattern. Thus, there is a small interference in memory of a pattern between a learning module and another learning module, and memory of a pattern is highly stable. Then, the "local representation" scheme is excellent in scalability that it is possible to easily learn a new pattern by adding a learning module.

However, in the "local representation" scheme, one pattern learning model learns one pattern, that is, memory of a pattern is independently performed in each of a plurality of learning modules. Therefore, it is difficult to obtain generalization capability by structuring (commonizing) the relationship between respective memories of patterns of the plurality of learning modules, that is, it is difficult to, for example, generate, so to speak, an intermediate pattern, which differs from a pattern stored in a learning module and also differs from a pattern stored in another learning module.

On the other hand, in the "distributed representation" scheme, one learning module stores a plurality of patterns, that is, one pattern learning model learns a plurality of patterns. Thus, it is possible to obtain generalization capability by commonizing memories of a plurality of patterns owing to interference between the memories of the plurality of patterns in one learning module.

However, in the "distributed representation" scheme, stability of memories of patterns is low, so there is no scalability.

Here, Japanese Unexamined Patent Application Publication No. 2002-024795 describes that contexts of two RNNs are changed on the basis of an error between the contexts of two RNNs, one of which learns a pattern and the other one of which learns another pattern that correlates with the pattern to perform learning of the RNNs, and one of the contexts of the learned two RNNs is used as a context of the other RNN, that is, a context of one of the RNNs is caused to influence a context of the other one of the RNNs to generate output data (input data are input to an input layer of an RNN, and output data corresponding to the input data are output from an output layer of the RNN).

In addition, Yuuya Sugita, Jun Tani, "Learning Semantic Combinatoriality from the Interaction between Linguistic and Behavioral Processes", Adaptive Behavior, Vol. 13, No. 1, 33-52 (2005), describes that RNNPBs learn by changing PBs of the two RNNPBs on the basis of a difference between the PBs of the two RNNPBs, one of which learns a pattern of language and the other learns a pattern of action, and one of the PBs of the learned two RNNPBs is caused to influence the other PB to generate output data.

SUMMARY OF THE INVENTION

As described above, in learning of an existing pattern learning model, it is possible to obtain a pattern learning model having scalability or a pattern learning model having generalization capability; however, it is difficult to obtain a pattern learning model having both scalability and generalization capability at a time.

It is desirable to be able to obtain a pattern learning model having both scalability and generalization capability at a time.

According to an embodiment of the invention, a learning device includes: a plurality of learning modules, each of which performs update learning to update a plurality of model parameters of a pattern learning model that learns a pattern using input data; model parameter sharing means for causing two or more learning modules from among the plurality of learning modules to share the model parameters; and sharing strength updating means for updating sharing strengths between the learning modules so as to minimize learning errors when the plurality of model parameters are updated by the update learning.

According to another embodiment of the invention, a learning method includes the steps of: performing update learning to update a plurality of model parameters of a pattern learning model that learns a pattern using input data in each of a plurality of learning modules; causing two or more learning modules from among the plurality of learning modules to share the model parameters; and updating sharing strengths between the learning modules so as to minimize learning errors when the plurality of model parameters are updated by the update learning.

According to further another embodiment of the invention, a program for causing a computer to function as: a plurality of learning modules that performs update learning to update a plurality of model parameters of a pattern learning model that learns a pattern using input data; model parameter sharing means for causing two or more learning modules from among the plurality of learning modules to share the model parameters; and sharing strength updating means for updating sharing strengths between the learning modules so as to minimize learning errors when the plurality of model parameters are updated by the update learning.

In the embodiment of the invention, update learning is performed to update a plurality of model parameters of a pattern learning model that learns a pattern using input data in each of a plurality of learning modules, and the model parameters are shared between two or more learning modules from among the plurality of learning modules. In addition, sharing strengths between the learning modules are updated so as to minimize learning errors when the plurality of model parameters are updated by the update learning.

DESCRIPTION OF THE PREFERRED EMBODIMENTS

Figure 1:
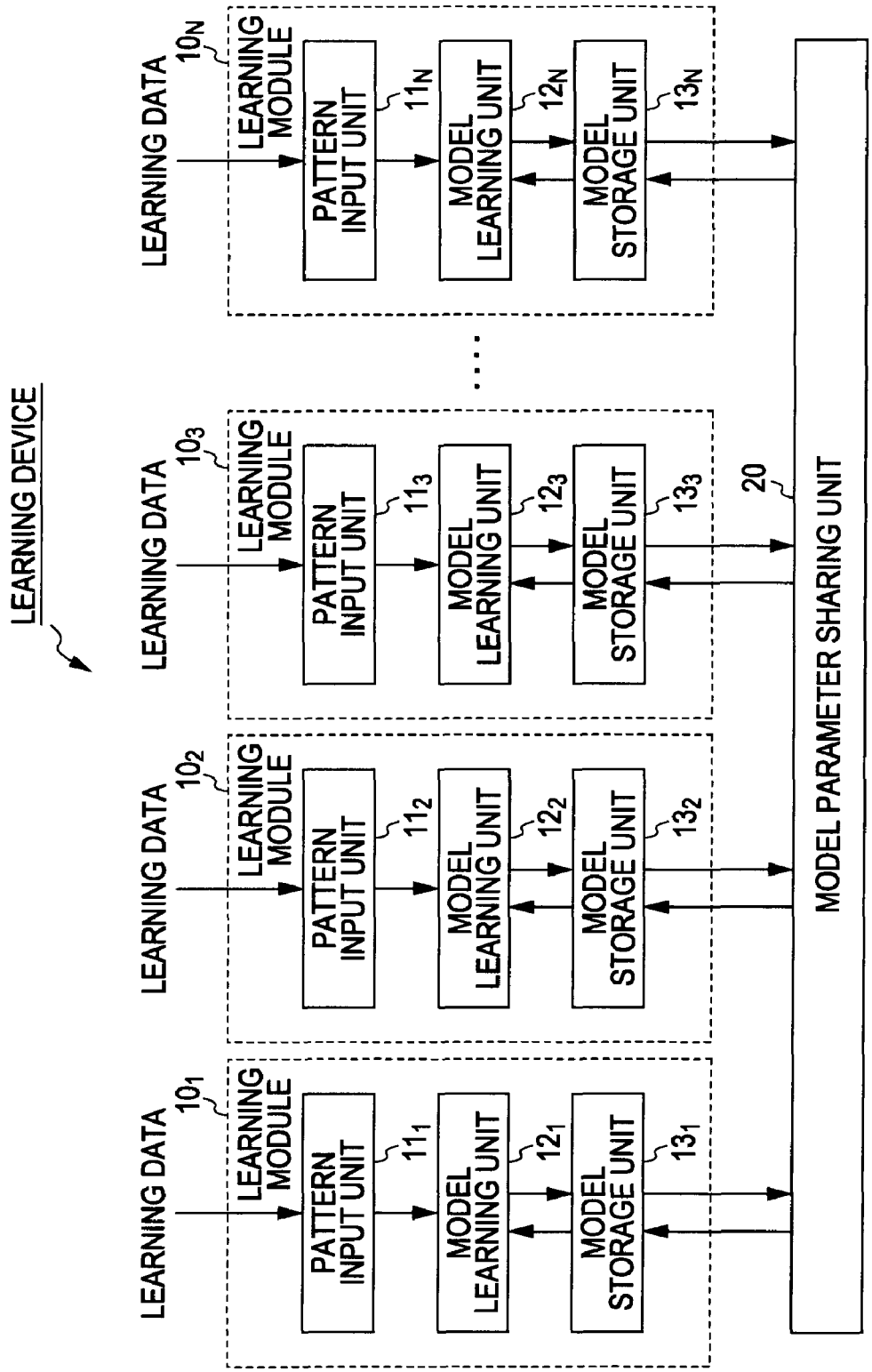
FIG. 1 is a block diagram that shows a configuration example of one embodiment of a learning device, which is a basic learning device to which an embodiment of the invention is applied.

FIG. 1 is a configuration example of one embodiment of a learning device, which is a base of a learning device to which an embodiment of the invention is applied.

As shown in FIG. 1, the learning device is formed of a plurality of N learning modules $10_1$ to $10_N$ and a model parameter sharing unit 20.

Each learning module $10_i$ (i=1, 2, ..., N) is formed of a pattern input unit $11_i$, a model learning unit $12_i$ and a model storage unit $13_i$, and uses input data to perform update learning to update a plurality of model parameters (learning resources) of a pattern learning model.

That is, each pattern input unit $11_i$ is supplied with input data of a pattern (category) that a pattern learning model stored in the model storage unit $13_i$ acquires (learns) as learning data used for learning of the pattern learning model.

The pattern input unit $11_i$ converts the learning data supplied thereto into data in an appropriate format for learning of the pattern learning model, and then supplies the data to the model learning unit $12_i$. That is, for example, when learning data are time-series data, the pattern input unit $11_i$, for example, separates the time-series data in a fixed length and then supplies the separated time-series data to the model learning unit $12_i$.

The model learning unit $12_i$ uses the learning data supplied from the pattern input unit $11_i$ to perform update learning to update a plurality of model parameters of the pattern learning model stored in the model storage unit $13_i$.

The model storage unit $13_i$ has a plurality of model parameters and stores a pattern learning model that learns a pattern. That is, the model storage unit $13_i$ stores a plurality of model parameters of a pattern learning model.

Here, the pattern learning model may, for example, employ a model, or the like, that learns (acquires) (stores) a time-series pattern, which is a pattern in time series, or a dynamics that represents a dynamical system changing over time.

A model that learns a time-series pattern is, for example, an HMM (Hidden Markov Model), or the like, and a model that learns a dynamics is a neural network, such as an RNN, an FNN (Feed Forward Neural Network) and an RNNPB, or an SVR (Support Vector Regression), or the like.

For example, for an HMM, a state transition probability that indicates a probability at which a state makes a transition in the HMM and an output probability that indicates a probability at which an observed value is output from the HMM or an output probability density function that indicates a probability density when a state makes a transition are model parameters of the HMM.

In addition, for example, for a neural network, a weight assigned to an input to a unit (node), corresponding to a neuron, from another unit is a model parameter of the neural network.

Note that there are more than one state transition probability, output probability or output probability density function of an HMM and more than one weight of a neural network.

The model parameter sharing unit 20 performs sharing process to cause two or more learning modules from among the N learning modules $10_1$ to $10_N$ to share model parameters. As the model parameter sharing unit 20 performs sharing process, two or more learning modules from among the N learning modules $10_1$ to $10_N$ share model parameters.

Note that, hereinafter, for easy description, the model parameter sharing unit 20 performs sharing process to cause all the N learning modules $10_1$ to $10_N$ to share model parameters.

Next, the learning process in which the learning device shown in FIG. 1 learns a pattern learning model will be described with reference to the flowchart shown in FIG. 2.

In step S11, the model learning unit $12_i$ of each learning module $10_i$ initializes model parameters stored in the model storage unit $13_i$, for example, by random number, or the like, and then the process proceeds to step S12.

In step S12, the learning module $10_i$ waits until learning data to be learned by the learning module $10_i$ are supplied (input), and then uses the learning data to perform update learning to update the model parameters.

That is, in step S12, in the learning module $10_i$, the pattern input unit $11_i$, where necessary, processes the learning data supplied to the learning module $10_i$ and then supplies the learning data to the model learning unit $12_i$.

Furthermore, in step S12, the model learning unit $12_i$ uses the learning data supplied from the pattern input unit $11_i$ to perform update learning to update a plurality of model parameters of the pattern learning model stored in the model storage unit $13_i$, and then updates (overwrites) the content stored in the model storage unit $13_i$ by a plurality of new model parameters obtained through the update learning.

Here, the processes in steps S11 and S12 are performed in all the N learning modules $10_1$ to $10_N$.

After step S12, the process proceeds to step S13, and then the model parameter sharing unit 20 performs sharing process to cause all the N learning modules $10_1$ to $10_N$ to share the model parameters.

That is, when focusing on, for example, the mth model parameter from among a plurality of model parameters of the learning module $10_i$, the model parameter sharing unit 20 corrects the mth model parameter of the learning module $10_1$ on the basis of the respective mth model parameters of the N learning modules $10_1$ to $10_N$.

Furthermore, the model parameter sharing unit 20 corrects the mth model parameter of the learning module $10_2$ on the basis of the respective mth model parameters of the N learning modules $10_1$ to $10_N$, and, thereafter, similarly, corrects the respective mth model parameters of the learning modules $10_3$ to $10_N$.

As described above, the model parameter sharing unit 20 corrects the mth model parameter of the learning module $10_i$ on the basis of the respective mth model parameters of the N learning modules $10_1$ to $10_N$. Thus, each of the respective mth model parameters of the N learning modules $10_1$ to $10_N$ is influenced by all the respective mth model parameters of the N learning modules $10_1$ to $10_N$ (all the mth model parameters of the N learning modules $10_1$ to $10_N$ influence each of the mth model parameters of the N learning modules $10_1$ to $10_N$).

In this way, all the model parameters of the plurality of learning modules influence each of the model parameters of the plurality of learning modules (each of the model parameters of the plurality of learning modules is influenced by all the model parameters of the plurality of learning modules). This is to share model parameters among the plurality of learning modules.

In step S13, the model parameter sharing unit 20 performs sharing process over all the plurality of model parameters stored in the model storage unit $13_i$ of the learning module $10_i$, and then updates the content stored in the model storage units $13_1$ to $13_N$ using the model parameters obtained through the sharing process.

After step S13, the process proceeds to step S14, and then the learning device shown in FIG. 1 determines whether the learning termination condition is satisfied.

Here, the learning termination condition in step S14 may be, for example, when the number of learning times, that is, the number of times steps S12 and S13 are repeated, reaches a predetermined number of times, when the update learning in step S12 is performed using all pieces of prepared learning data, or when, if a true value of output data to be output for input data has been obtained, an error of output data output from the pattern learning model for the input data with respect to the true value is smaller than or equal to a predetermined value.

In step S14, when it is determined that the learning termination condition is not satisfied, the process returns to step S12, and, thereafter, the same processes are repeated.

In addition, in step S14, when it is determined that the learning termination condition is satisfied, the process ends.

Note that the processes of step S12 and step S13 may be performed in reverse order. That is, it is applicable that, after the sharing process is performed to cause all the N learning modules $10_1$ to $10_N$ to share the model parameters, update learning is performed to update the model parameters.

Figure 3:
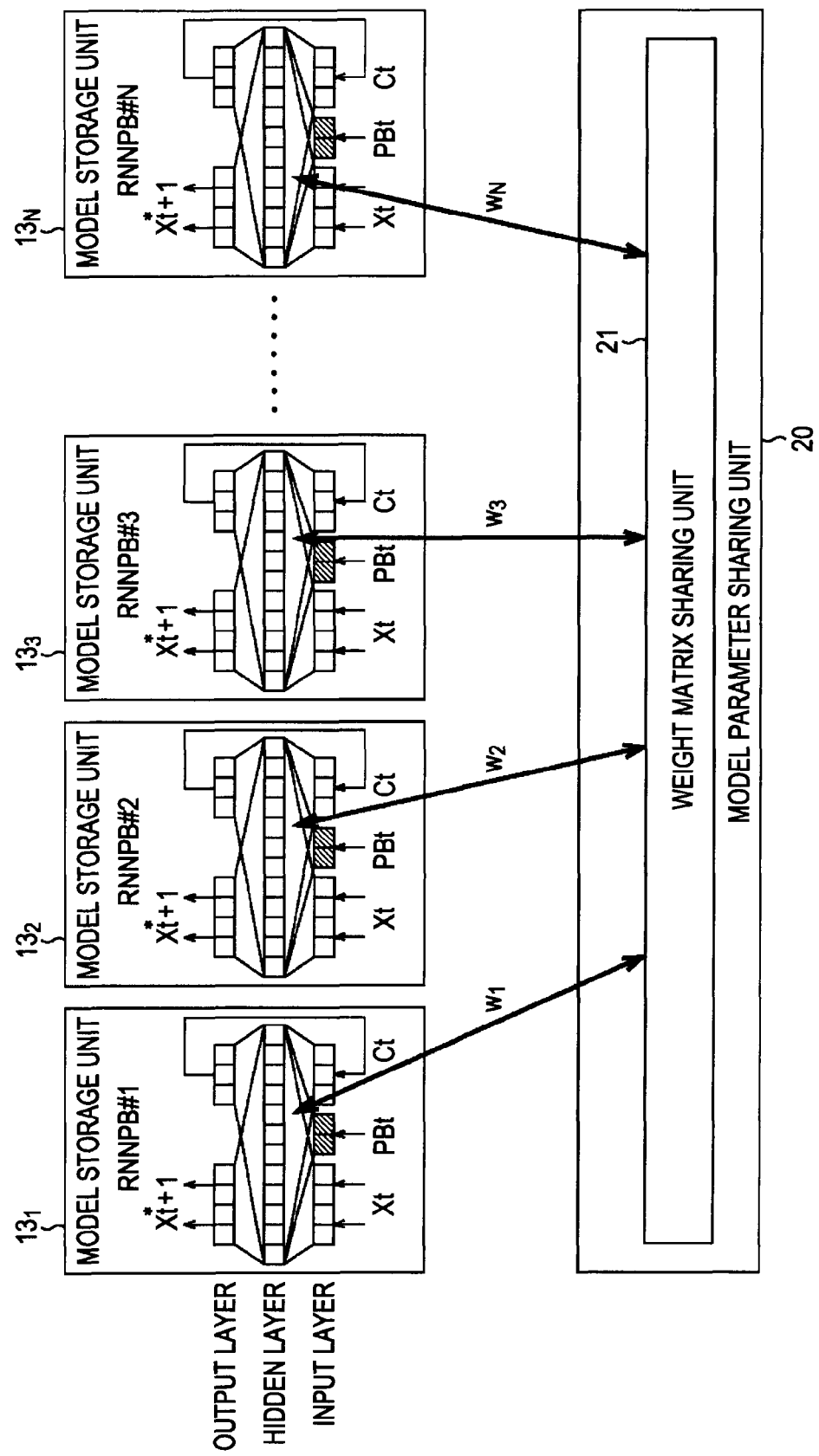
FIG. 3 is a block diagram that shows a configuration example of the learning device shown in FIG. 1 when RNNPBs are employed as pattern learning models.

Next, FIG. 3 shows a configuration example of the learning device shown in FIG. 1 when RNNPBs are employed as pattern learning models.

Note that in FIG. 3, the pattern input unit $11_i$ and model learning unit $12_i$ of each learning module $10_i$ are not shown.

Each model storage unit $13_i$ stores an RNNPB (model parameters that define an RNNPB). Hereinafter, the RNNPB stored in the model storage unit $13_i$ is referred to as RNNPB#i where appropriate.

Each RNNPB is formed of an input layer, a hidden layer (intermediate layer) and an output layer. The input layer, hidden layer and output layer are respectively formed of selected number of units corresponding to neurons.

In each RNNPB, input data $x_t$, such as time-series data, are input (supplied) to input units, which are a portion of units of the input layer. Here, the input data $x_t$ may be, for example, the characteristic amount of an image or audio, the locus of movement of a portion corresponding to a hand or foot of a robot, or the like.

In addition, a PB (Parametric Bias) is input to PB units, which are a portion of units of the input layer other than the input units to which the input data $x_t$ are input. With the PB, even when the same input data $x_t$ are input to RNNPBs in the same state, different output data $x^*_{t+1}$ may be obtained by changing the PB.

Output data output from a portion of units of the output layer are fed back to context units, which are the remaining units of the input layer other than the input units to which the input data $x_t$ are input as a context that indicates the internal state.

Here, the PB and context at time t, which are input to the PB units and context units of the input layer when input data $x_t$ at time t are input to the input units of the input layer are respectively denoted by $PB_t$ and $c_t$.

The units of the hidden layer operate weighted addition using a predetermined weight for the input data $x_t$, $PB_t$ and context $c_t$ input to the input layer, calculate a nonlinear function that uses the results of the weighted addition as arguments, and then outputs the calculated results to the units of the output layer.

As described above, output data of a context $c_{t+1}$ at the next time t+1 are output from a portion of units of the output layer, and are fed back to the input layer. In addition, a predicted value $x^*_{t+1}$ of the input data $x_{t+1}$ at the next time t+1 of the input data $x_t$ is, for example, output from the remaining units of the output layer as output data corresponding to the input data $x_t$.

Here, in each RNNPB, an input to each unit is subjected to weighted addition, and the weight used for the weighted addition is a model parameter of the RNNPB. Five types of weights are used as model parameters of the RNNPB. The weights include a weight from input units to units of the hidden layer, a weight from PB units to units of the hidden layer, a weight from context units to units of the hidden layer, a weight from units of the hidden layer to units of the output layer and a weight from units of the hidden layer to context units.

When the above RNNPB is employed as a pattern learning model, the model parameter sharing unit 20 includes a weight matrix sharing unit 21 that causes the learning modules $10_1$ to $10_N$ to share weights, which serve as the model parameters of each RNNPB.

Here, the plurality of weights are present as the model parameters of each RNNPB, and a matrix that includes the plurality of weights as components is called a weight matrix.

The weight matrix sharing unit 21 causes the learning modules $10_1$ to $10_N$ to share all the weight matrices, which are the plurality of model parameters of the RNNPB#1 to RNNPB#N and stored respectively in the model storage units $13_1$ to $13_N$.

That is, if the weight matrix of the RNNPB#i is denoted by $w_i$, the weight matrix sharing unit 21 corrects the weight matrix $w_i$ on the basis of all the weight matrices $w_1$ to $w_N$ of the respective N learning modules $10_1$ to $10_N$ to thereby perform sharing process to make all the weight matrices $w_1$ to $w_N$ influence the weight matrix wi.

Specifically, the weight matrix sharing unit 21, for example, corrects the weight matrix $w_i$ of the RNNPB#i in accordance with the following equation (1).

$$w_i = w_i + \Delta w_i \qquad (1)$$

Here, in equation (1), $\Delta wi$ is a correction component used to correct the weight matrix wi, and is, for example, obtained in accordance with equation (2).

$$\Delta w_i = \alpha_i \sum_{j=1}^{N} \beta_{ij}(w_j - w_i) \qquad (2)$$

In equation (2), $\beta_{ij}$ denotes a coefficient (fixed value) that indicates a degree to which each weight matrix $w_j$ of the RNNPB#j (j=1, 2, ..., N) influences the weight matrix $w_i$ of the RNNPB#i.

Thus, the summation $\Sigma\beta_{ij}(w_j-w_i)$ on the right-hand side in equation (2) indicates a weighted average value of errors (differentials) of the respective weight matrices $w_1$ to $w_N$ of the RNNPB#1 to RNNPB#N with respect to the weight matrix $w_i$ using the coefficient $\beta_{ij}$ as a weight, and $\alpha_i$ is a coefficient that indicates a degree to which the weighted average value $\Sigma\beta_{ij}(w_j-w_i)$ influences the weight matrix wi.

The coefficients $\alpha_i$ and $\beta_{ij}$ may be, for example, larger than 0.0 and smaller than 1.0.

According to equation (2), as the coefficient $\alpha_i$ reduces, sharing becomes weaker (the influence of the weighted average value $\Sigma\beta_{ij}(w_j-w_i)$ received by the weight matrix $w_i$ reduces), whereas, as the coefficient $\alpha_i$ increases, sharing becomes stronger.

Note that a method of correcting the weight matrix $w_i$ is not limited to equation (1), and may be, for example, performed in accordance with equation (3).

$$w_i = \alpha'_i \cdot w_i + (1 - \alpha'_i) \cdot \sum_{j=1}^{N} \beta'_{ij} \cdot w_j \qquad (3)$$

Here, in equation (3), $\beta_{ij}$ denotes a coefficient that indicates a degree to which each weight matrix $w_j$ of the RNNPB#j (j=1, 2, ..., N) influences the weight matrix $w_i$ of the RNNPB#i.

Thus, the summation $\Sigma\beta_{ij}'w_j$ at the second term of the right-hand side in equation (3) indicates a weighted average value of the weight matrices $w_1$ to $w_N$ of the RNNPB#1 to the RNNPB#N using the coefficient $\beta_{ij}'$ as a weight, and $\alpha_i'$ is a coefficient that indicates a degree to which the weighted average value $\Sigma\beta_{ij}'w_j$ influences the weight matrix wi.

The coefficients $\alpha_i'$ and $\beta_{ij}'$ may be, for example, larger than 0.0 and smaller than 1.0.

According to equation (3), as the coefficient $\alpha_i'$ increases, sharing becomes weaker (the influence of the weighted average value $\Sigma\beta_{ij}'w_j$ received by the weight matrix $w_i$ reduces), whereas, as the coefficient $\alpha_i'$ reduces, sharing becomes stronger.

Next, the learning process of the learning device shown in FIG. 1 when RNNPBs are employed as pattern learning models will be described with reference to the flowchart of FIG. 4.

In step S21, the model learning unit $12_i$ of each learning module $10_i$ initializes the weight matrix wi, which has model parameters of the RNNPB#i stored in the model storage unit $13_i$, for example, by random number, or the like, and then the process proceeds to step S22.

In step S22, the learning module $10_i$ waits until learning data $x_t$ to be learned by the learning module $10_i$ are input, and then uses the learning data $x_t$ to perform update learning to update the model parameters.

That is, in step S22, in the learning module $10_i$, the pattern input unit $11_i$, where necessary, processes the learning data $x_t$ supplied to the learning module $10_i$ and then supplies the learning data $x_t$ to the model learning unit $12_i$.

Furthermore, in step S22, the model learning unit $12_i$ uses the learning data $x_t$ supplied from the pattern input unit $11_i$ to perform update learning to update the weight matrix $w_i$ of the RNNPB#i stored in the model storage unit $13_i$ by means of, for example, BPTT (Back-Propagation Through Time) method, and then updates the content stored in the model storage unit $13_i$ by the weight matrix wi, which has new model parameters obtained through the update learning.

Here, the processes in steps S21 and S22 are performed in all the N learning modules $10_1$ to $10_N$.

In addition, the BPTT method is, for example, described in Japanese Unexamined Patent Application Publication No. 2002-236904, or the like.

After step S22, the process proceeds to step S23, and then the weight matrix sharing unit 21 of the model parameter sharing unit 20 performs sharing process to cause all the N learning modules $10_1$ to $10_N$ to share all the weight matrices $w_1$ to $w_N$.

That is, in step S23, the weight matrix sharing unit 21, for example, uses the weight matrices $w_1$ to $w_N$ stored respectively in the model storage units $13_1$ to $13_N$ to calculate correction components $\Delta w_1$ to $\Delta w_N$ in accordance with equation (2), and then corrects the weight matrices $w_1$ to $w_N$ stored respectively in the model storage units $13_1$ to $13_N$ using the correction components $\Delta w_1$ to $\Delta w_N$ in accordance with equation (1).

After step S23, the process proceeds to step S24, and then the learning device shown in FIG. 1 determines whether the learning termination condition is satisfied.

Here, the learning termination condition that in step S24 may be, for example, when the number of learning times, that is, the number of times steps S22 and S23 are repeated, reaches a predetermined number of times, or when an error of output data $x^*_{t+1}$ output from the RNNPB#i for input data $x_t$, that is, a predicted value $x^*_{t+1}$ of the input data $x_{t+1}$, with respect to the input data $x_{t+1}$ is smaller than or equal to a predetermined value.

In step S24, when it is determined that the learning termination condition is not satisfied, the process returns to step S22, and, thereafter, the same processes are repeated, that is, the update learning of the weight matrix $w_i$ and the sharing process are alternately repeated.

In addition, in step S24, when it is determined that the learning termination condition is satisfied, the process ends.

Figure 4:
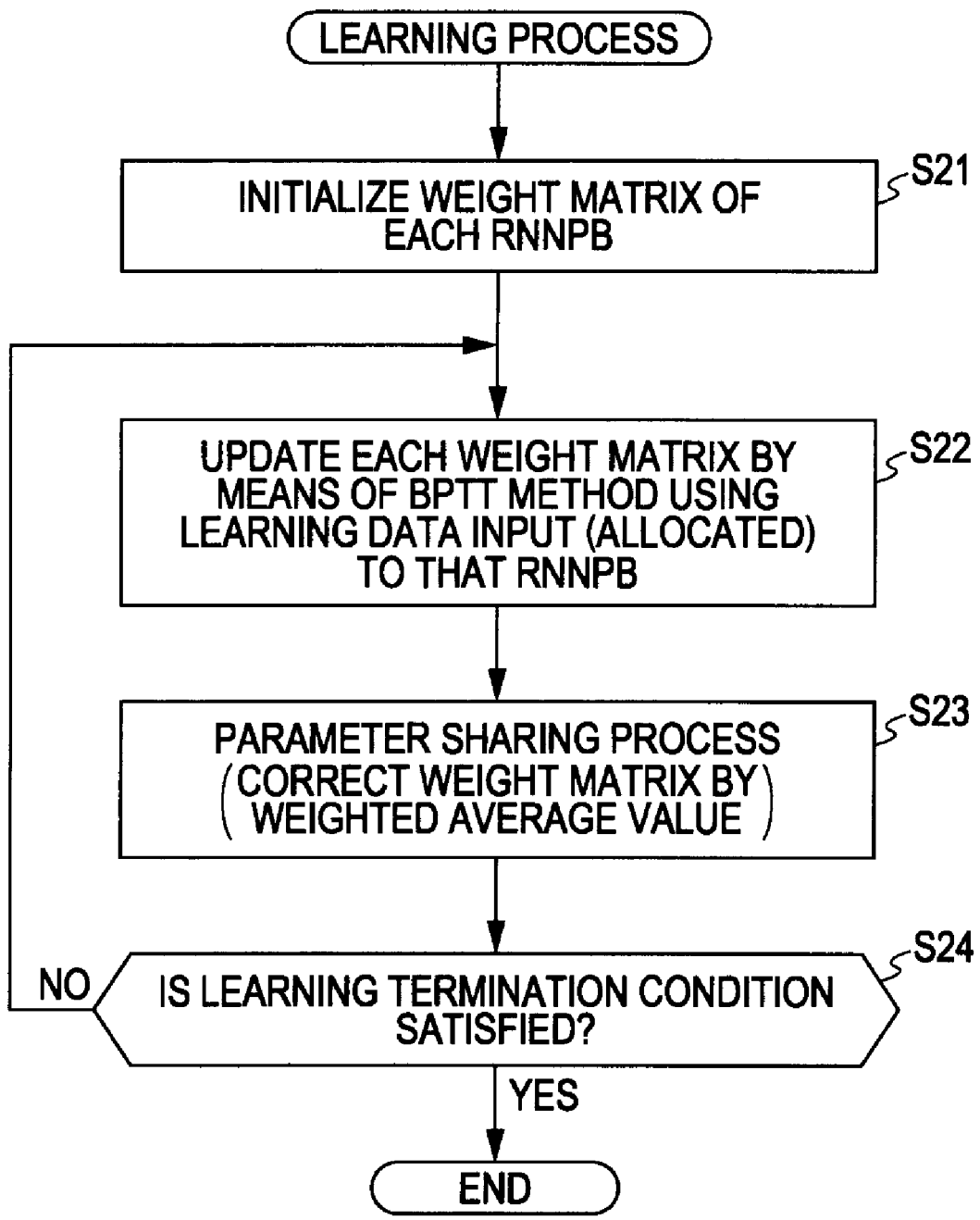
FIG. 4 is a flowchart that illustrates a learning process of the learning device shown in FIG. 1 when RNNPBs are employed as pattern learning models.

Note that, in FIG. 4 as well, the processes of step S22 and step S23 may be performed in reverse order.

As described above, in each of the plurality of learning modules $10_1$ to $10_N$ that are excellent in scalability, model parameters are shared while update learning is performed to update the model parameters of each of the plurality of learning modules $10_1$ to $10_N$. Thus, generalization capability obtained through learning in only one learning module may be obtained by all the plurality of learning modules $10_1$ to $10_N$. As a result, it is possible to obtain a pattern learning model that has scalability and generalization capability at a time.

That is, a large number of patterns may be acquired (stored), and a commonality of a plurality of patterns may be acquired. Furthermore, by acquiring a commonality of a plurality of patterns, it is possible to recognize or generate an unlearned pattern on the basis of the commonality.

Specifically, for example, when audio data of N types of phonemes are given to each of the N learning modules $10_1$ to $10_N$ as learning data, and learning of the pattern learning models is performed, the pattern learning models are able to recognize or generate audio data of a time-series pattern that is not used for learning. Furthermore, for example, when N types of driving data for driving an arm of a robot are given to each of the N learning modules $10_1$ to $10_N$ as learning data, and learning of the pattern learning models is performed, the pattern learning models are able to generate time-series pattern driving data that are not used for learning and, as a result, the robot is able to perform untaught action of the arm.

In addition, the learned pattern learning models are able to evaluate similarity among the pattern learning models on the basis of distances among model parameters (resources) of the pattern learning models, and to cluster patterns as a cluster, each of which includes pattern learning models having high similarity.

Next, the results of simulation of learning process (hereinafter, referred to as share learning process where appropriate) performed by the learning device shown in FIG. 1, conducted by the inventors, will be described with reference to FIG. 5 to FIG. 9E.

Figure 5:
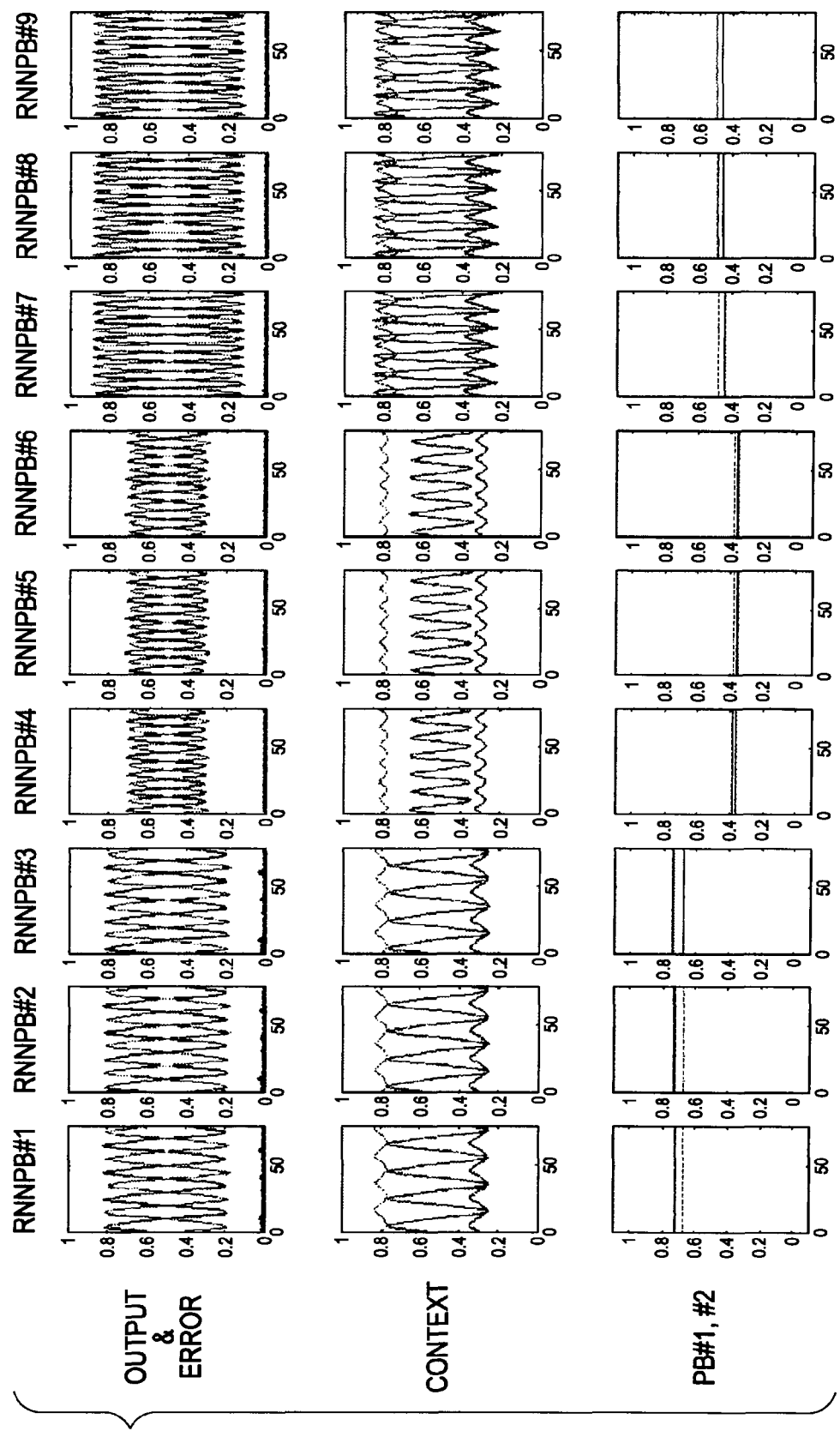
FIG. 5 is a view that shows the results of simulation.

FIG. 5 shows pieces of data about pattern learning models on which learning is performed in share learning process.

Note that, in the simulation, nine RNNPB#1 to RNNPB#9, to which two PBs are input to the input layers and three contexts are fed back to the input layers, were employed as pattern learning models, and nine pieces of time-series data that are obtained by superimposing three different noises N#1, N#2 and N#3 on time-series data of three patterns P#1, P#2 and P#3 as learning data were used.

In addition, time-series data obtained by superimposing the noise N#1 on time-series data of the pattern P#1 are given to the RNNPB#1 as learning data, time-series data obtained by superimposing the noise N#2 on time-series data of the pattern P#1 are given to the RNNPB#2 as learning data, and time-series data obtained by superimposing the noise N#3 on time-series data of the pattern P#1 are given to the RNNPB#3 as learning data.

Similarly, time-series data obtained by superimposing the noise N#1 on time-series data of the pattern P#2 are given to the RNNPB#4 as learning data, time-series data obtained by superimposing the noise N#2 on time-series data of the pattern P#2 are given to the RNNPB#5 as learning data, and time-series data obtained by superimposing the noise N#3 on time-series data of the pattern P#2 are given to the RNNPB#6 as learning data. In addition, time-series data obtained by superimposing the noise N#1 on time-series data of the pattern P#3 are given to the RNNPB#7 as learning data, time-series data obtained by superimposing the noise N#2 on time-series data of the pattern P#3 are given to the RNNPB#8 as learning data, and time-series data obtained by superimposing the noise N#3 on time-series data of the pattern P#3 are given to the RNNPB#9 as learning data.

Note that update learning was performed so as to reduce an error (prediction error) of a predicted value $x^*_{t+1}$ of input data $x_{t+1}$, which are output data output from each RNNPB for the input data $x_t$, with respect to the input data $x_{t+1}$.

The uppermost row in FIG. 5 shows output data output respectively from the RNNPB#1 to RNNPB#9 and prediction errors of the output data when learning data given at the time of learning are given to the learned RNNPB#1 to RNNPB#9 as input data.

In the uppermost row in FIG. 5, the prediction errors are almost zero, so the RNNPB#1 to the RNNPB#9 output the input data, that is, output data that substantially coincide with the learning data given at the time of learning.

The second row from above in FIG. 5 shows changes over time of three contexts when the learned RNNPB#1 to RNNPB#9 output the output data shown in the uppermost row in FIG. 5.

In addition, the third row from above in FIG. 5 show changes over time of two PB2 (hereinafter, two PB2 are respectively referred to as PB#1 and PB#2 where appropriate) when the learned RNNPB#L to RNNPB#9 output the output data shown in the uppermost row in FIG. 5.

Figure 6:
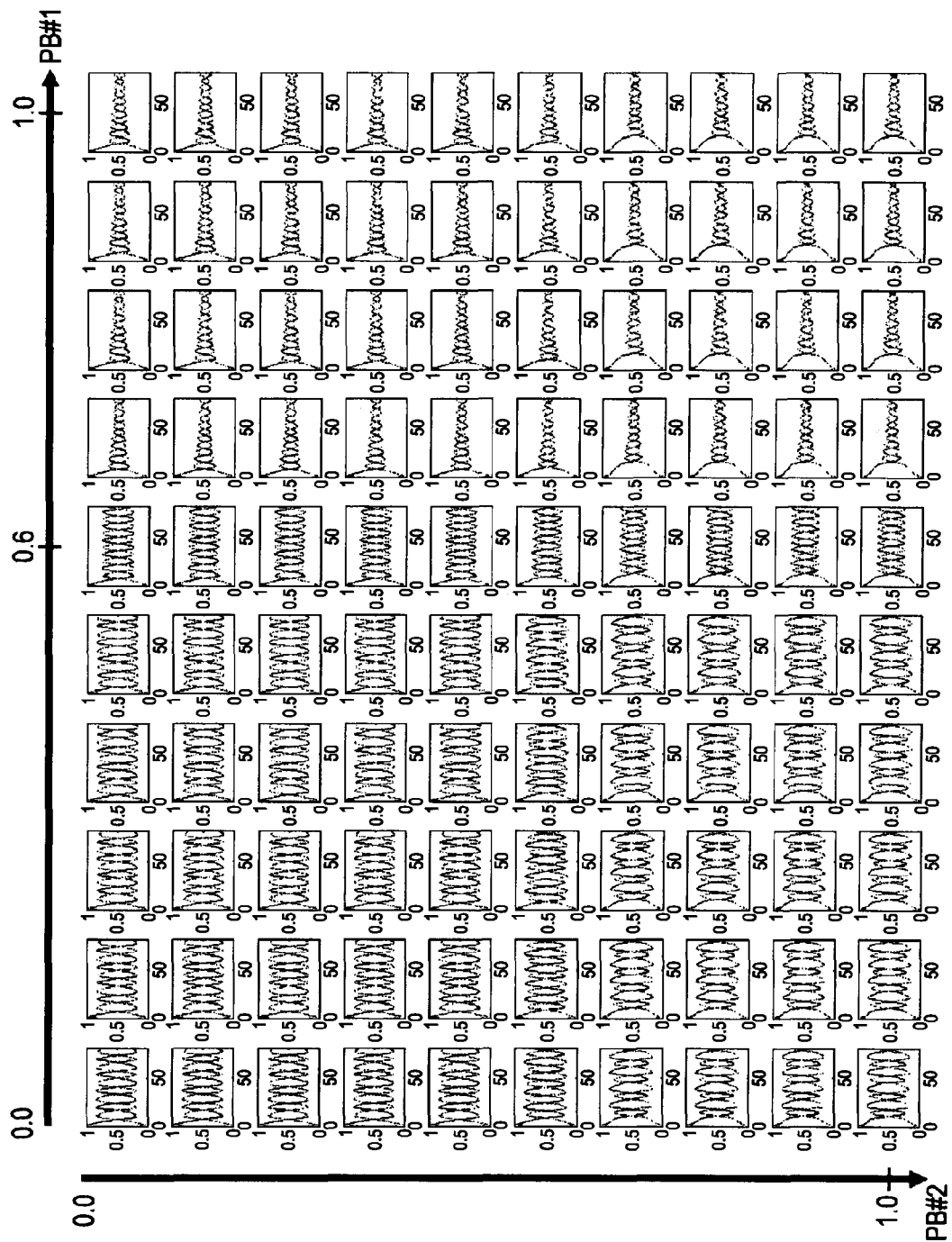
FIG. 6 is a view that shows the results of simulation.

FIG. 6 shows output data output to the PB#1 and PB#2 of each value from, for example, the fifth RNNPB#5 from among the learned RNNPB#1 to RNNPB#9.

Note that in FIG. 6, the abscissa axis represents the PB#1, and the ordinate axis represents the PB#2.

According to FIG. 6, the RNNPB#5 outputs output data that substantially coincide with learning data given at the time of learning when the PB#1 is about 0.6. Thus, it is found that the RNNPB#5 has the pattern P#2 of the learning data given at the time of learning.

In addition, the RNNPB#5 outputs time-series data that are similar to the pattern P#1 learned by the RNNPB#1 to the RNNPB#3 and the pattern P#3 learned by the RNNPB#7 to the RNNPB#9 when the PB#1 is smaller than 0.6. Thus, it is found that the RNNPB#5 receives the influence of the pattern P#1 acquired by the RNNPB#1 to the RNNPB#3 or the influence of the pattern P#3 acquired by the RNNPB#7 to the RNNPB#9, and also has an intermediate pattern that appears when the pattern P#2 of learning data given to the RNNPB#5 at the time of learning deforms toward the pattern P#1 acquired by the RNNPB#1 to the RNNPB#3 or the pattern P#3 acquired by the RNNPB#7 to the RNNPB#9.

Furthermore, the RNNPB#5 outputs time-series data of a pattern that is not learned by any of the nine RNNPB#1 to RNNPB#9 when the PB#1 is larger than 0.6. Thus, it is found that the RNNPB#5 receives the influence of the pattern P#1 acquired by the RNNPB#1 to the RNNPB#3 or the pattern P#3 acquired by the RNNPB#7 to the RNNPB#9, and also has a pattern that appears when the pattern P#2 of learning data given to the RNNPB#5 at the time of learning deforms toward a side opposite to the pattern P#1 acquired by the RNNPB#1 to the RNNPB#3 or a side opposite to the pattern P#3 acquired by the RNNPB#7 to the RNNPB#9.

Figure 7:
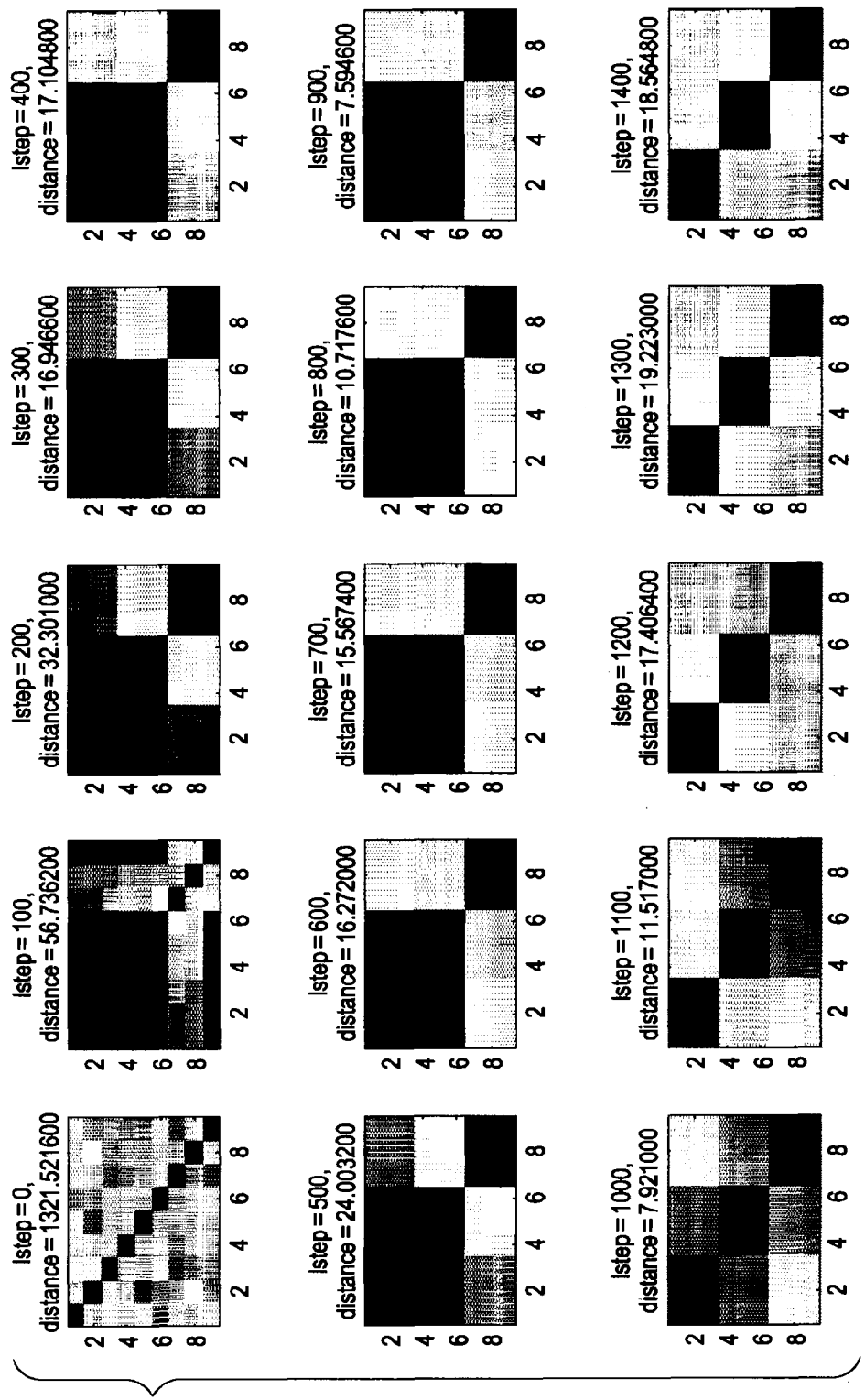
FIG. 7 is a view that shows the results of simulation.

Next, FIG. 7 shows rectangular maps that indicate distances in correlation among the weight matrices of the respective nine RNNPB#1 to RNNPB#9, that is, for example, distances among vectors that have weights constituting each of the weight matrices in a vector space.

Note that as the distance between the weight matrices reduces, the correlation between those two weight matrices becomes higher.

In the maps of FIG. 7, the abscissa axis and the ordinate axis both represent the weight matrices of the respective nine RNNPB#1 to RNNPB#9. A distance between the weight matrix in the abscissa axis and the weight matrix in the ordinate axis is indicated by light and dark. A darker (black)

portion indicates that the distance is smaller (a lighter (white) portion indicates that the distance is larger).

In FIG. 7, among the horizontal five by vertical three maps, the upper left map indicates distances among weight matrices when the number of learning times is 0, that is, distances among initialized weight matrices, and, in the map, only distances between the weight matrices of the same RNNPB#i, arranged in a diagonal line, are small.

Hereinafter, FIG. 7 shows maps when learning progresses as it goes rightward and downward, and the lower right map indicates distances among weight matrices when the number of learning times is 1400.

According to FIG. 7, it is found that, as learning progresses, distances among the weight matrices of the RNNPB#1 to RNNPB#3 that have learned time-series data of the same pattern P#1, distances among the weight matrices of the RNNPB#4 to RNNPB#6 that have learned time-series data of the same pattern P#2 and distances among the weight matrices of the RNNPB#7 to RNNPB#9 that have learned time-series data of the same pattern P#3 become small.

Figure 8:
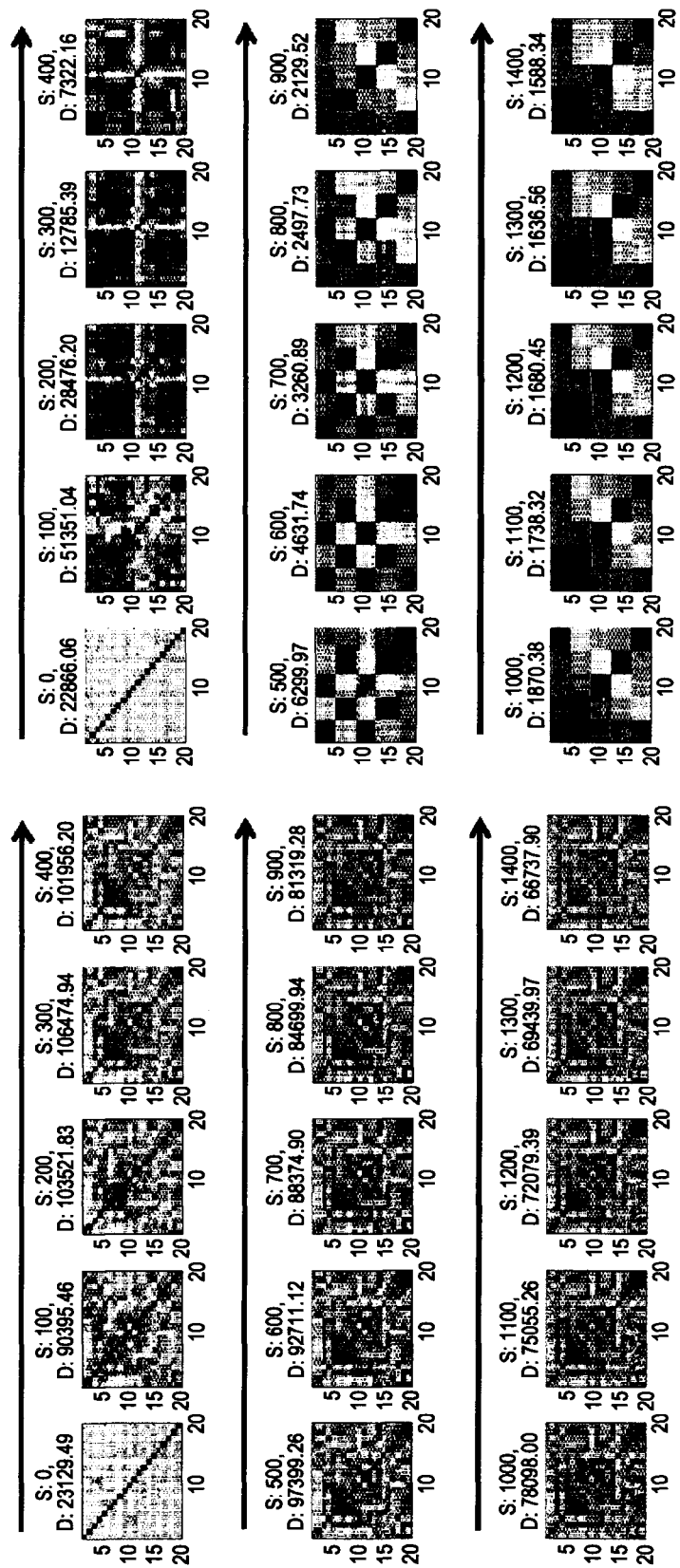
FIG. 8 is a view that shows the results of simulation.
Figure 9A:
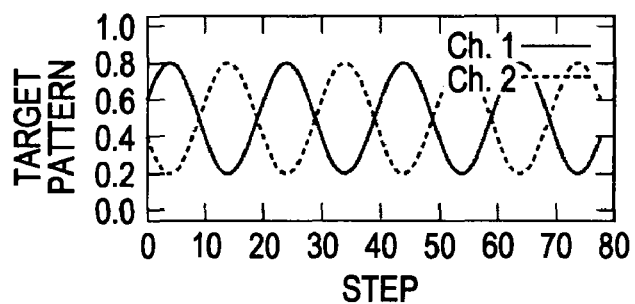
FIG. 9A to FIG. 9E are views that show time-series data used in simulation.
Figure 9B:
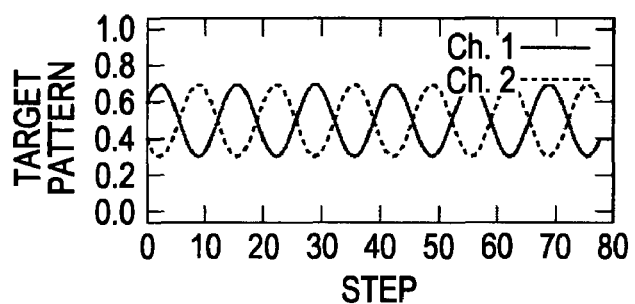
Figure 9C:
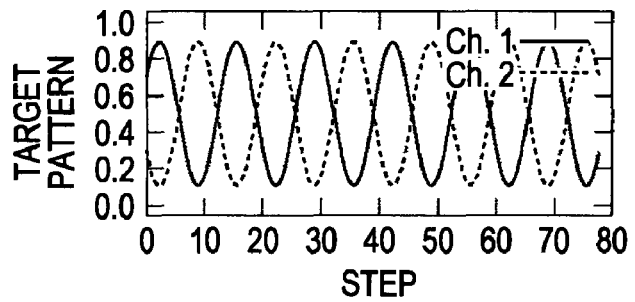
Figure 9D:
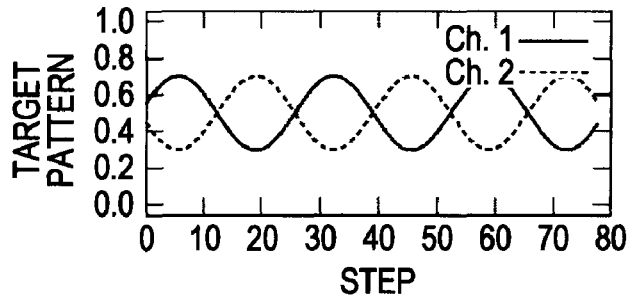
Figure 9E:
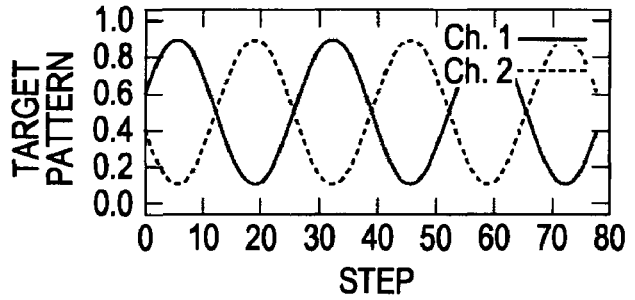

FIG. 8 shows maps similar to those of FIG. 7, indicating that distances as correlation among weight matrices of RNNPBs that have learned time-series data different from those in the case of FIG. 5 to FIG. 7.

Note that in the simulation for creating the maps of FIG. 8, twenty pieces of time-series data that are obtained by superimposing four different noises N#1, N#2, N#3 and N#4 on each of the pieces of time-series data of five types of patterns P#1, P#2, P#3, P#4 and P#5 shown in FIG. 9 were prepared, and one RNNPB was caused to learn the pieces of time-series data. Thus, the RNNPB used in simulation for creating the maps of FIG. 8 are 20 RNNPB#1 to RNNPB#20.

In addition, when learning, the time-series data of the pattern P#1 were given to the RNNPB#1 to the RNNPB#4, the time-series data of the pattern P#2 were given to the RNNPB#5 to the RNNPB#8, the time-series data of the pattern P#3 were given to the RNNPB#9 to the RNNPB#12, the time-series data of the pattern P#4 were given to the RNNPB#13 to the RNNPB#16, the time-series data of the pattern P#5 were given to the RNNPB#17 to the RNNPB#20.

5×3 maps at the left side in FIG. 8 show maps when sharing is weak, that is, a degree to which all 20 weight matrices $w_1$ to $w_{20}$ influence each of the weight matrices $w_1$ to $w_{20}$ of the 20 RNNPB#L to RNNPB#20 is small, specifically, when the coefficient $\alpha_i$ of equation (2) is small (when $\alpha_i$ is substantially 0).

In addition, 5×3 maps at the right side in FIG. 8 show maps when sharing is strong, that is, when a degree to which all 20 weight matrices $w_1$ to $w_{20}$ influence each of the weight matrices $w_1$ to $w_{20}$ of the 20 RNNPB#1 to RNNPB#20 is large, specifically, when the coefficient $\alpha_i$ of equation (1) is not small.

Both when sharing is weak and when sharing is strong, only distances between the weight matrices of the same RNNPB#i, arranged in a diagonal line, are small in the upper left map when the number of learning times is zero.

Then, it is found that, when sharing is weak, as shown at the left side in FIG. 8, even when learning progresses, no particular tendency appears in the distances among the weight matrices, whereas, when sharing is strong, as shown at the right side in FIG. 8, distances among the weight matrices are small among RNNPBs that have learned the time-series data of the same patterns.

Thus, it is found that, through the sharing process, distributed representation is formed over a plurality of learning modules, and a plurality of RNNPBs have generalization capability.

Note that a method for update learning of model parameters by the model learning unit $12_i$ and a method for sharing process by the model parameter sharing unit 20 are not limited to the above described methods.

In addition, in the present embodiment, in the sharing process by the model parameter sharing unit 20, all the N learning modules $10_1$ to $10_N$ share the weight matrices as the model parameters; instead, for example, only a portion of the N learning modules $10_1$ to $10_N$ may share the weight matrices as the model parameters.

Furthermore, in the present embodiment, in the sharing process by the model parameter sharing unit 20, the learning modules $10_i$ share all the plurality of weights, as the plurality of model parameters, that constitute each weight matrix; instead, in the sharing process, no all the plurality of weights that constitute each weight matrix but only a portion of the weights among the plurality of weights that constitute each weight matrix may be shared.

In addition, only a portion of the N learning modules $10_1$ to $10_N$ may share only a portion of weights among a plurality of weights that constitute each weight matrix.

Note that, in the learning device shown in FIG. 1, the model parameter sharing unit 20 causes the plurality of learning modules $10_1$ to $10_N$ to share the model parameters. That is, in terms of influencing the weight matrices $w_1$ to $w_N$ of the RNNPB#1 to RNNPB#N in the respective learning modules $10_1$ to $10_N$ on the weight matrix wi, which has model parameters of the RNNPB#i as a pattern learning model in each learning module $10_i$, the learning device shown in FIG. 1 is similar to the technique described in Japanese Unexamined Patent Application Publication No. 2002-024795, in which, at the time of learning of RNNs, contexts of two RNNs are changed on the basis of an error between the contexts of two RNNs, that is, the contexts of two RNNs influence the context of each RNN.

However, in the learning device shown in FIG. 1, the weight matrix, which has model parameters, is influenced, which differs from the technique described in Japanese Unexamined Patent Application Publication No. 2002-024795 in which not model parameters but contexts, which are internal states, are influenced.

That is, when a pattern learning model expressed by a function is taken for example, the model parameters of the pattern learning model are constants (when an input u, an output y, an internal state x, and equations of states that model systems respectively expressed by y=Cx+Du and x'=Ax+Bu (x' denotes the derivative of x) are taken for example, A, B, C and D correspond to constants) that are obtained through learning and that define the function expressing the pattern learning model, and the constants differ from internal states (internal states x in the example of equations of states) that are not originally constant.

Similarly, in terms of that the weight matrices $w_1$ to $w_N$ of the RNNPB#L to RNNPB#N in the respective learning modules $10_1$ to $10_N$ influence the weight matrix wi, which has model parameters of the RNNPB#i as a pattern learning model in each learning module $10_i$, the learning device shown in FIG. 1 is similar to the technique described in Yuuya Sugita, Jun Tani, "Learning Semantic Combinatoriality from the Interaction between Linguistic and Behavioral Processes", Adaptive Behavior, Vol. 13, No. 1, 33-52 (2005), which changes each of respective PBs of two RNNPBs, that is, respective PBs of the two RNNPBs influence each of the respective PBs of the RNNPBs, on the basis of a difference between the respective PBs of the two RNNPBs at the time of learning of RNNPBs.

However, the learning device shown in FIG. 1 in which the weight matrix, which has model parameters, is influenced differs from the technique described in Yuuya Sugita, Jun Tani, "Learning Semantic Combinatoriality from the Interaction between Linguistic and Behavioral Processes", Adaptive Behavior, Vol. 13, No. 1, 33-52 (2005), in which not the model parameters but PBs, which are internal states (or correspond to internal states) are influenced.

That is, as described above, the model parameters of the pattern learning model are constants that are obtained through learning and that define the function expressing the pattern learning model, and differ from the internal states, which are not constants.

Then, the model parameters are constants that are obtained through learning and that define the function expressing the pattern learning model. Therefore, at the time of learning, the model parameters are updated (changed) so as to become values corresponding to a pattern to be learned; however, the model parameters are not changed when output data are generated (when input data are input to the input layer of an RNNPB, which is a pattern learning model, and output data corresponding to the input data are output from the output layer of the RNNPB).

On the other hand, the contexts on which technique described in Japanese Unexamined Patent Application Publication No. 2002-024795 focus and the PBs on which the technique described in Yuuya Sugita, Jun Tani, "Learning Semantic Combinatoriality from the Interaction between Linguistic and Behavioral Processes", Adaptive Behavior, Vol. 13, No. 1, 33-52 (2005) focus are internal states, which differ from the model parameters, so they are changed, of course, both at the time of learning and when output data are generated.

As described above, the learning device shown in FIG. 1 differs from any of the technique described in Japanese Unexamined Patent Application Publication No. 2002-024795 and the technique described in Yuuya Sugita, Jun Tani, "Learning Semantic Combinatoriality from the Interaction between Linguistic and Behavioral Processes", Adaptive Behavior, Vol. 13, No. 1, 33-52 (2005). As a result, it is possible to obtain a pattern learning model having scalability and generalization capability at a time.

Figure 10:
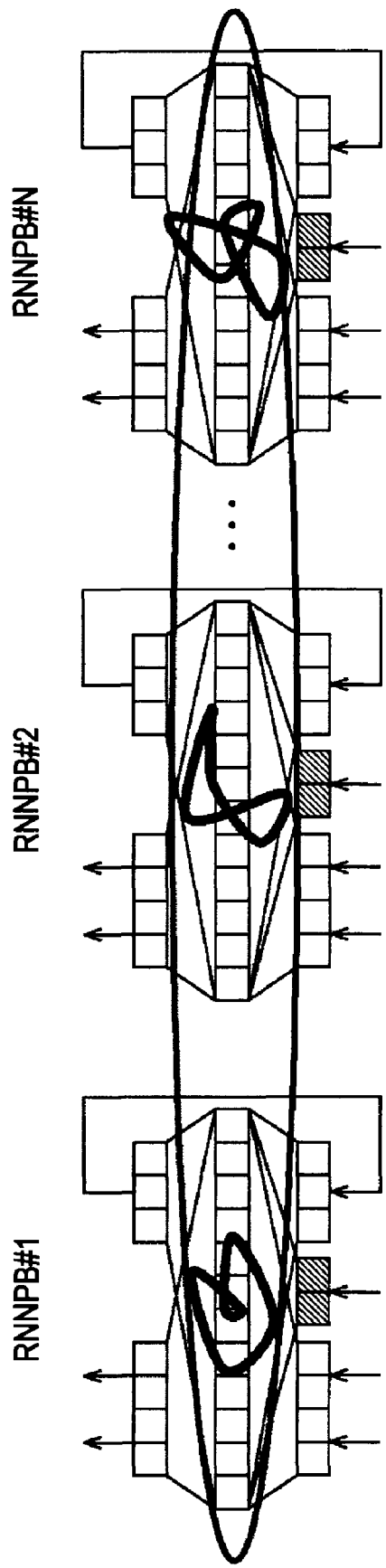
FIG. 10 is a view that schematically shows that model parameters of each RNNPB are shared.

That is, in the learning device shown in FIG. 1, for example, as shown in FIG. 10, respective model parameters of the pattern learning models, such as RNNPBs, are shared.

Figure 11:
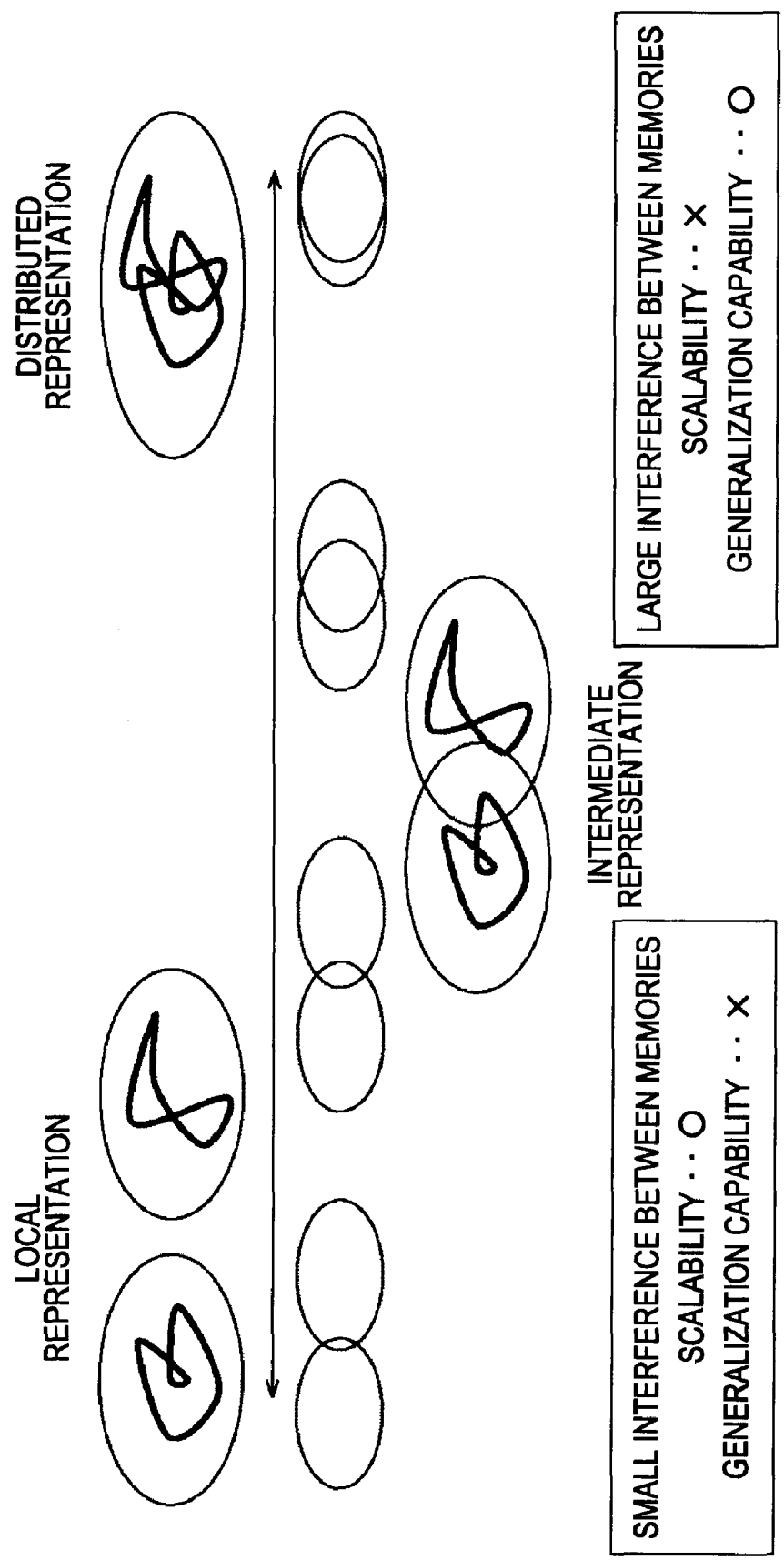
FIG. 11 is a view that schematically shows the relationship among a "local representation" scheme, a "distributed representation" scheme and an "intermediate representation" scheme.

As a result, according to the learning device shown in FIG. 1, as shown in FIG. 11, so to speak, learning of an "intermediate representation" scheme, which has the advantages of both the "local representation" scheme that is excellent in scalability but lacks in generalization capability and the "distributed representation" scheme that has generalization capability but lacks in scalability, is performed. Thus, it is possible to obtain a pattern learning model having both scalability and generalization capability at a time.

However, in the above described embodiment, it may be necessary to determine and set the strength of sharing (hereinafter, also referred to as sharing strength) of model parameters among the learning modules, in which the sharing strength corresponds to the coefficient $\beta_{ij}$ when RNNPBs are employed as pattern learning models; however, there is a problem that it is difficult to optimally set the sharing strength.

That is, when the set sharing strength is too strong, commonization is facilitated among the learning modules to improve generalization performance, whereas independence of each learning module becomes weak, and progress of learning is slow (learning takes longer time). On the contrary, when the set sharing strength is too weak, commonization of the learning modules does not progress, and generalization capability, which is one of the features of the learning device shown in FIG. 1, becomes weak. As a result, there is a problem that there is almost no difference from that each learning module individually learns.

In learning of a pattern, ideally, it is desirable that the sharing strength is set to be strong for the learning modules that learn similar patterns, and the sharing strength is set to be weak for learning modules that learn dissimilar patterns. However, similarity between patterns is not acquired before learning, and there is an aspect that it is difficult to set in the above way.

Then, next, a learning device that solves the above problem will be described. That is, an embodiment of the learning device that is able to dynamically change (control) the sharing strength between learning modules in process of learning so that the sharing strength is strong for learning modules that learn similar patterns and the sharing strength is weak for learning modules that learn dissimilar patterns will be described.

Note that, hereinafter, an embodiment that exemplifies the case in which RNNs, which are more general than RNNPBs and have no PB units in the input layer, are employed as pattern learning models, and the above described coefficient $\beta_{ij}$ of the RNNs is dynamically controlled as a sharing strength will be described. The RNNs are able to perform update learning, or the like, as well as the above described RNNPBs, except that the RNNs have no PB unit, so the description will be made by replacing the above described RNNPB#i with an RNN#i.

Figure 12:
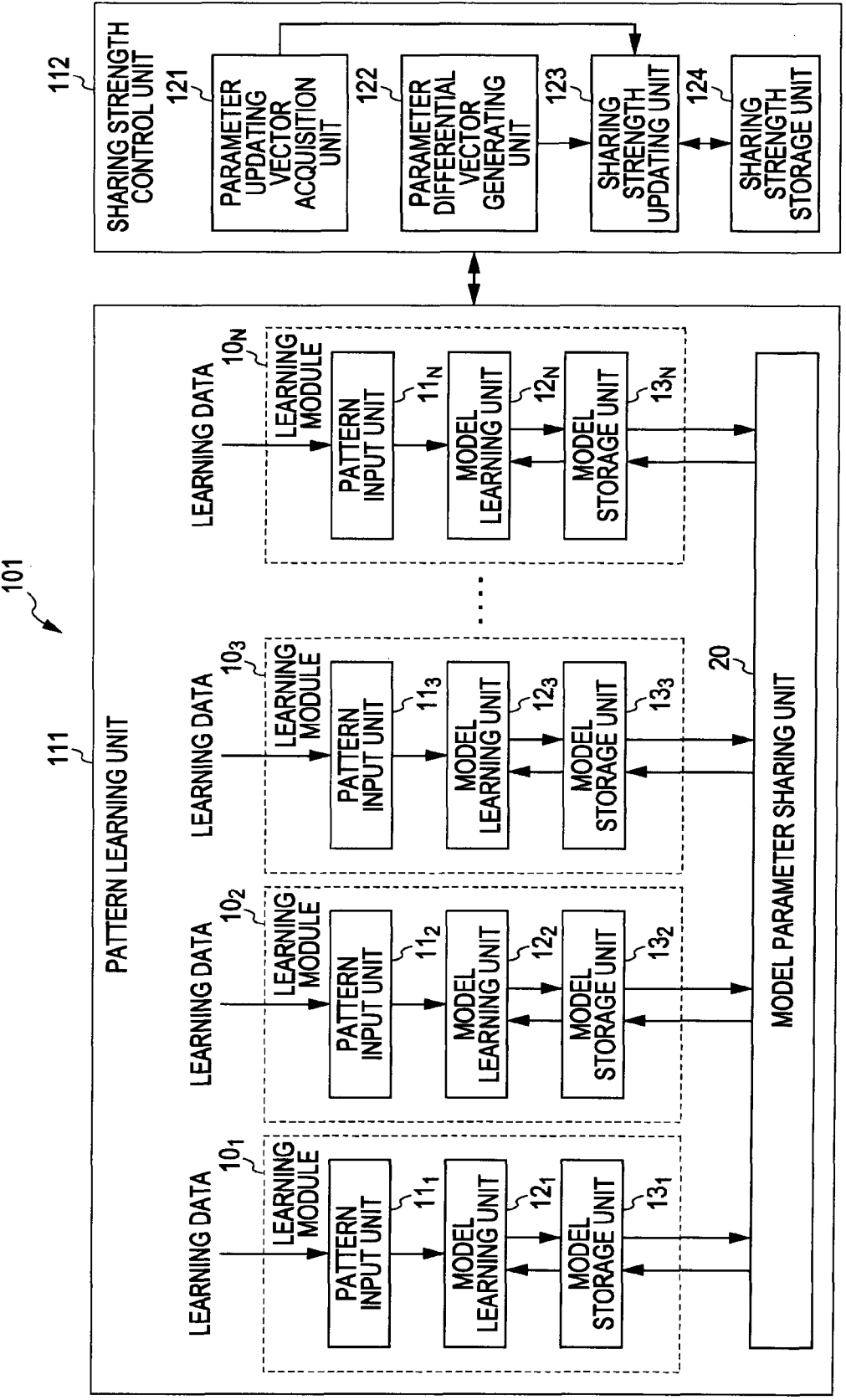
FIG. 12 is a block diagram that shows a configuration example of one embodiment of a learning device to which an embodiment of the invention is applied.

FIG. 12 shows a configuration example of a learning device according to an embodiment of the invention that is able to dynamically control the sharing strength (coefficient $\beta_{ij}$).

In FIG. 12, like reference numerals denote components corresponding to those of the learning device shown in FIG. 1, and the description thereof is omitted.

That is, the learning device $10_1$ shown in FIG. 12 is formed of a pattern learning unit 111 that has a configuration similar to the learning device shown in FIG. 1 and a sharing strength control unit 112 that controls the sharing strength.

The pattern learning unit 111 is formed of N learning modules $10_1$ to $10_N$, and performs update learning to learn (update) a plurality of model parameters (learning resources) of each pattern learning model, that is, the weight matrix $w_i$ of each RNN#i.

The sharing strength control unit 112 includes a parameter updating vector acquisition unit 121, a parameter differential vector generating unit 122, a sharing strength updating unit 123 and a sharing strength storage unit 124. The sharing strength control unit 112 controls (updates) the sharing strength so as to minimize learning errors when the N learning modules $10_1$ to $10_N$ learn.

Updating of the sharing strength by the sharing strength control unit 112 will be described with reference to FIG. 13.

Figure 13:
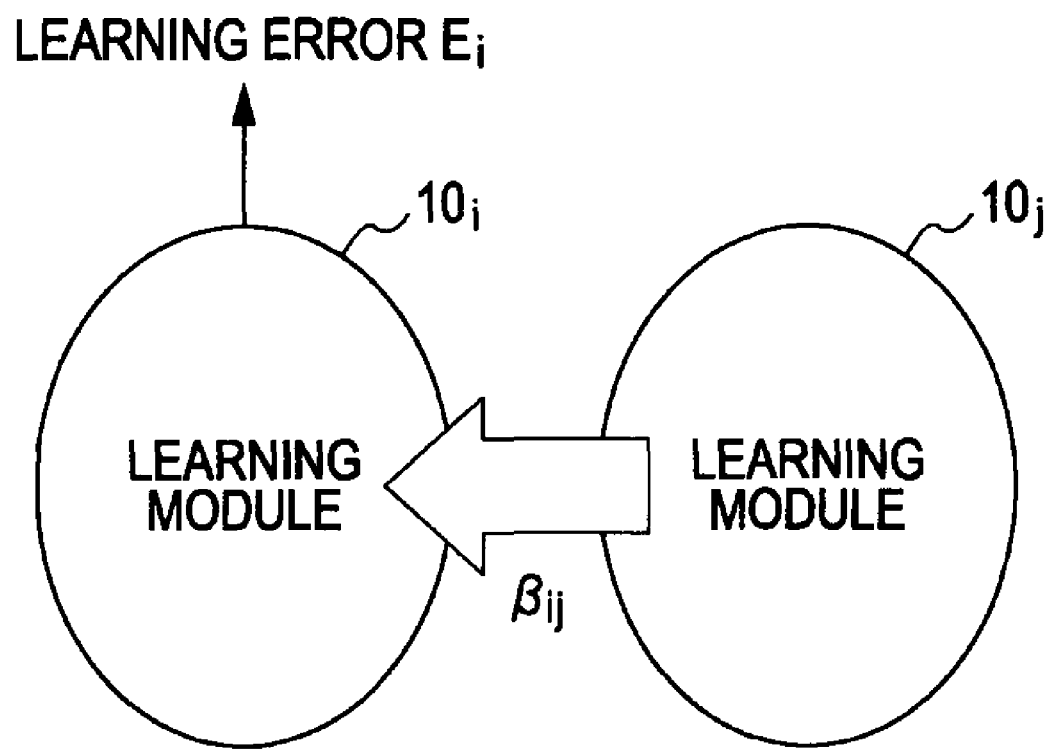
FIG. 13 is a view for illustrating a manner of updating sharing strengths.

The coefficient $\beta_{ij}$, which is the sharing strength, when RNNs are employed as pattern learning models is a coefficient having a directivity, and, as shown in FIG. 13, is a coefficient that indicates the strength of influence from the learning module $10_j$ to the learning module $10_i$. In other words, the coefficient $\beta_{ij}$ indicates the strength of influence of the weight matrix $w_j$ of the RNN#j to the weight matrix $w_i$ of the RNN#i.

The sharing strength control unit 112 updates the coefficient $\beta_{ij}$ so as to minimize a learning error $E_i$ when the model parameters of the learning module $10_i$ are updated through learning. That is, when the update amount of the coefficient $\beta_{ij}$ is $\beta_{ij}$, equation for updating the coefficient $\beta_{ij}$ may be expressed by the following equation (4), and the update amount $\beta_{ij}$ in equation (4) may be expressed by equation (5).

$$\beta_{ij} = \beta_{ij} + \Delta\beta_{ij} \quad (4)$$

$$\Delta\beta_{ij} = \eta \cdot \frac{\partial E_i}{\partial \beta_{ij}} \quad (5)$$

In equation (5), $\partial E_i/\partial \beta_{ij}$ represents a direction (gradient) in which the learning error $E_i$ is minimized, and $\eta$ denotes a coefficient (learning rate) that indicates how much it advances in that minimized direction each time.

Here, equation (5) may be developed as expressed by equation (6).

$$\frac{\partial E_i}{\partial \beta_{ij}} = \frac{\partial E_i}{\partial w_i} \cdot \frac{\partial w_i}{\partial \Delta w_i} \cdot \frac{\partial \Delta w_i}{\partial \beta_{ij}} \quad (6)$$

$\partial w_i/\partial \Delta w_i$ in equation (6) is a result obtained by partially differentiating equation (1) with respect to $\Delta w_i$, and is equal to 1. In addition, $\partial \Delta w_i/\partial \beta_{ij}$ in equation (6) is a result obtained by partially differentiating equation (2) with respect to $\beta_{ij}$, and may be substantially expressed only by $(w_j - w_i)$. Thus, equation (5) may be substantially expressed by equation (7).

$$\Delta\beta_{ij} = \eta \cdot \frac{\partial E_i}{\partial w_i} \cdot (w_j - w_i) \quad (7)$$

$\partial E_i/\partial w_i$ in equation (7) indicates the update amount (update amount vector) when the weight matrix $w_i$ obtained in a process of BPTT at the time of learning is updated. On the other hand, $(w_j - w_i)$ in equation (7) is a differential vector that is obtained by subtracting the weight matrix $w_i$ from the weight matrix $w_j$. Thus, the update amount $\beta_{ij}$ of the coefficient $\beta_{ij}$ is obtained from a correlation (inner product) of the update amount vector of the weight matrix $w_i$ through learning and the differential vector obtained by subtracting the weight matrix $w_i$ from the weight matrix $w_j$.

In other words, the update amount of the sharing strength is a correlation (inner product) of a parameter updating vector at the time of learning of the learning module $10_i$ (update amount vector at the time of updating model parameters of the learning module $10_i$) and a model parameter differential vector obtained by subtracting the model parameters of the learning module $10_i$ from the model parameters of the learning module $10_j$.

Equation (7) conceptually indicates that, when focusing on the learning module $10_i$, if the learning module $10_j$ has relatively more number of components in the same learning direction as the learning module $10_i$, a sharing degree with the learning module $10_j$ is strengthened to increase $\beta_{ij}$, whereas, if the learning module $10_j$ has relatively more number of components in a learning direction different from the learning module $10_i$, a sharing degree with the learning module $10_j$ is weakened to reduce $\beta_{ij}$.

Thus, each time model parameters are updated through learning, the sharing strength control unit 112 calculates the inner product of an update amount vector based on updating of model parameters and a model parameter differential vector for each learning module and then uses the result to update the sharing degree using equation (4).

Referring back to FIG. 12, the processes of the parameter updating vector acquisition unit 121, the parameter differential vector generating unit 122, the sharing strength updating unit 123 and the sharing strength storage unit 124 will be respectively described.

The parameter updating vector acquisition unit 121 acquires an update amount vector, at the time when the model parameters of the learning module $10_i$ are updated, for calculating the update amount of the sharing strength of the learning module $10_i$. In the pattern learning model that employs an RNN, the parameter updating vector acquisition unit 121 acquires $\partial E_i/\partial w_i$ in equation (7), obtained in a process of BPTT of the RNN#i.

The parameter differential vector generating unit 122 acquires the model parameters of the learning module $10_i$ and the model parameters of the learning module $10_j$ from the pattern learning unit 111 for calculating the update amount of the sharing strength of the learning module $10_i$. Then, the parameter differential vector generating unit 122 generates a model parameter differential vector that is obtained by subtracting the model parameters of the learning module $10_i$ from the model parameters of the learning module $10_j$. In the pattern learning model that employs an RNN, the parameter differential vector generating unit 122 acquires the weight matrix $w_i$ and the weight matrix $w_j$, and then generates a differential vector $(w_j - w_i)$ that is obtained by subtracting the weight matrix $w_i$ from the weight matrix $w_j$.

The sharing strength updating unit 123 updates the sharing strength using the parameter updating vector acquired by the parameter updating vector acquisition unit 121 and the model parameter differential vector generated by the parameter differential vector generating unit 122. In the pattern learning model that employs an RNN, the sharing strength updating unit 123 obtains an update amount $\Delta\beta_{ij}$ from equation (7), and then obtains an updated coefficient $\beta_{ij}$ using equation (4).

The sharing strength updating unit 123 supplies the updated sharing strength (coefficient $\beta_{ij}$) to each of the learning modules $10_1$ to $10_N$ of the pattern learning unit 111 and causes the sharing strength storage unit 124 to store the updated sharing strength. The sharing strength stored in the sharing strength storage unit 124 is acquired by the sharing strength updating unit 123 at the time of updating next time, and is used as a current sharing strength (coefficient $\beta_{ij}$) in equation (4).

Next, the learning process of the learning device 101 that also dynamically controls the sharing strength will be described with reference to the flowchart of FIG. 14.

In step S41, the model learning unit $12_i$ of each learning module $10_i$ initializes model parameters stored in the model storage unit $13_i$, for example, by random number, or the like. In the pattern learning model that employs an RNN, the weight matrix $w_i$, which has model parameters of the RNN#i, stored in the model storage unit $13_i$ is initialized, for example, by random number, or the like.

Note that the processes in step S41 and step S43 described later are performed over all the N learning modules $10_1$ to $10_N$ as in the case of the above described learning processes shown in FIG. 2 and FIG. 4.

In step S42, the model parameter sharing unit 20 performs sharing process to cause all the N learning modules $10_1$ to $10_N$ to share the model parameters. In the pattern learning model that employs an RNN, the weight matrix sharing unit 21 performs sharing process to cause all the N learning modules $10_1$ to $10_N$ to share all the weight matrices $w_1$ to $w_N$.

In step S43, the learning module $10_i$ waits until learning data to be learned by the learning module $10_i$ are supplied (input), and then uses the learning data to perform update learning to update the model parameters.

In the pattern learning model that employs an RNN, in step S43, the model learning unit $12_i$ uses the learning data $x_t$ supplied from the pattern input unit $11_i$ to perform update learning to update the weight matrix $w_i$ of the RNN#i stored in the model storage unit $13_i$ by means of, for example, BPTT (Back-Propagation Through Time) method, and then updates the content stored in the model storage unit $13_i$ by the weight matrix $w_i$, which has new model parameters, obtained through the update learning.

In step S44, the sharing strength control unit 112 performs sharing strength dynamic control in which, for all the N learning modules $10_1$ to $10_N$, the learned parameter updating vector and model parameter differential vector are used to update the sharing strength among the learning modules. The detail of the process in step S44 will be described with reference to FIG. 15.

After step S44, the process proceeds to step S45, and then the learning device 101 determines whether the learning termination condition is satisfied.

In step S45, when it is determined that the learning termination condition is not satisfied, the process returns to step S42, and, thereafter, the same processes are repeated.

In addition, in step S45, when it is determined that the learning termination condition is satisfied, the process ends.

Figure 2:
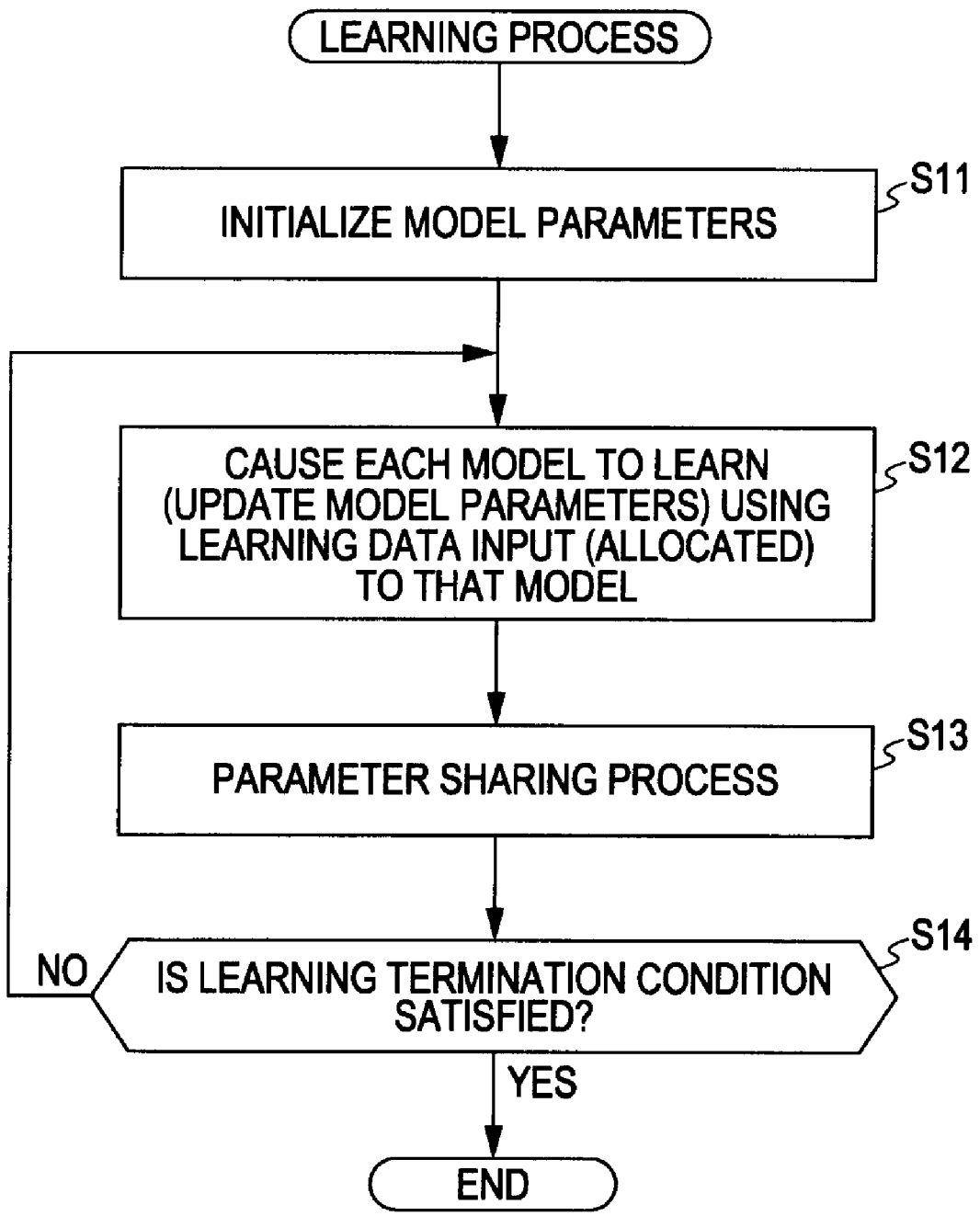
FIG. 2 is a flowchart that illustrates a learning process of the learning device shown in FIG. 1.
Figure 14:
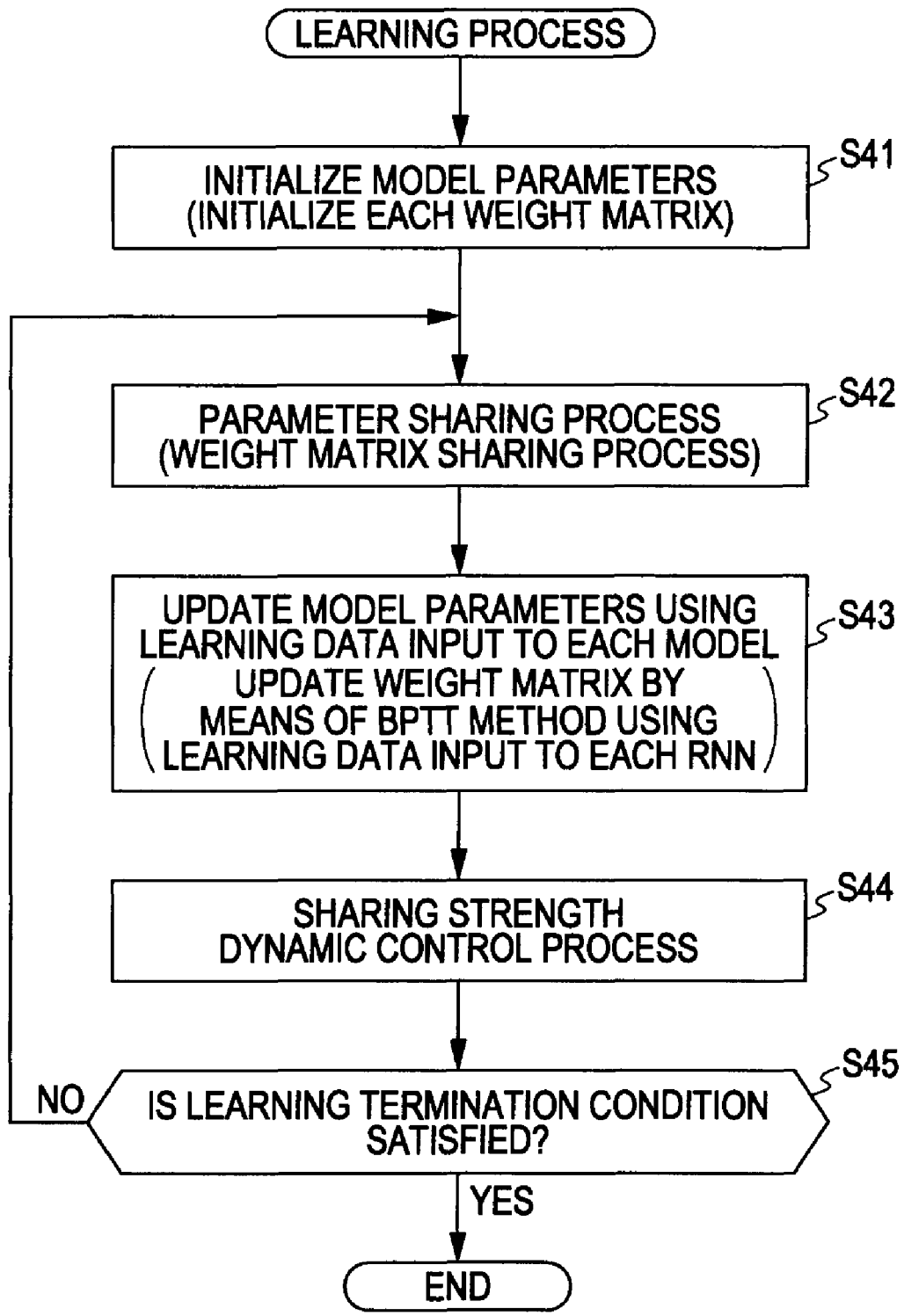
FIG. 14 is a flowchart that illustrates a learning process of the learning device shown in FIG. 12.

When comparing the learning process shown in FIG. 14 with the learning process shown in FIG. 2, the order of updating model parameters and sharing process of the model parameters are reversed. That is, in the learning process shown in FIG. 2, after the model parameters are updated in step S12, sharing process for the parameters are performed in step S13. On the other hand, in the learning process shown in FIG. 14, after sharing process for model parameters are performed in step S42, the model parameters are updated in step S43.

In the learning process shown in FIG. 2, as described above, the order of the processes in step S12 and step S13 may be any order; however, in the learning process that also dynamically controls the sharing strength, it is desirable that, as shown in FIG. 14, model parameters are updated after sharing process for the model parameters are performed.

This is because in the learning process that also dynamically controls the sharing strength, as described above, a value of an update amount vector immediately after updating model parameters may be directly used to calculate an update amount of the sharing strength. In other words, when sharing process for model parameters is performed after updating the model parameters, not a value of an update amount vector immediately after updating model parameters but an update amount vector after sharing process for model parameters (after commonizing) is used to calculate an update amount of the sharing strength. Thus, calculation of an update amount of the sharing strength involves an error with respect to a value of an update amount vector immediately after updating. Note that when the error may be ignored, the processes may be performed in the same order as that of the learning process in FIG. 2.

Figure 15:
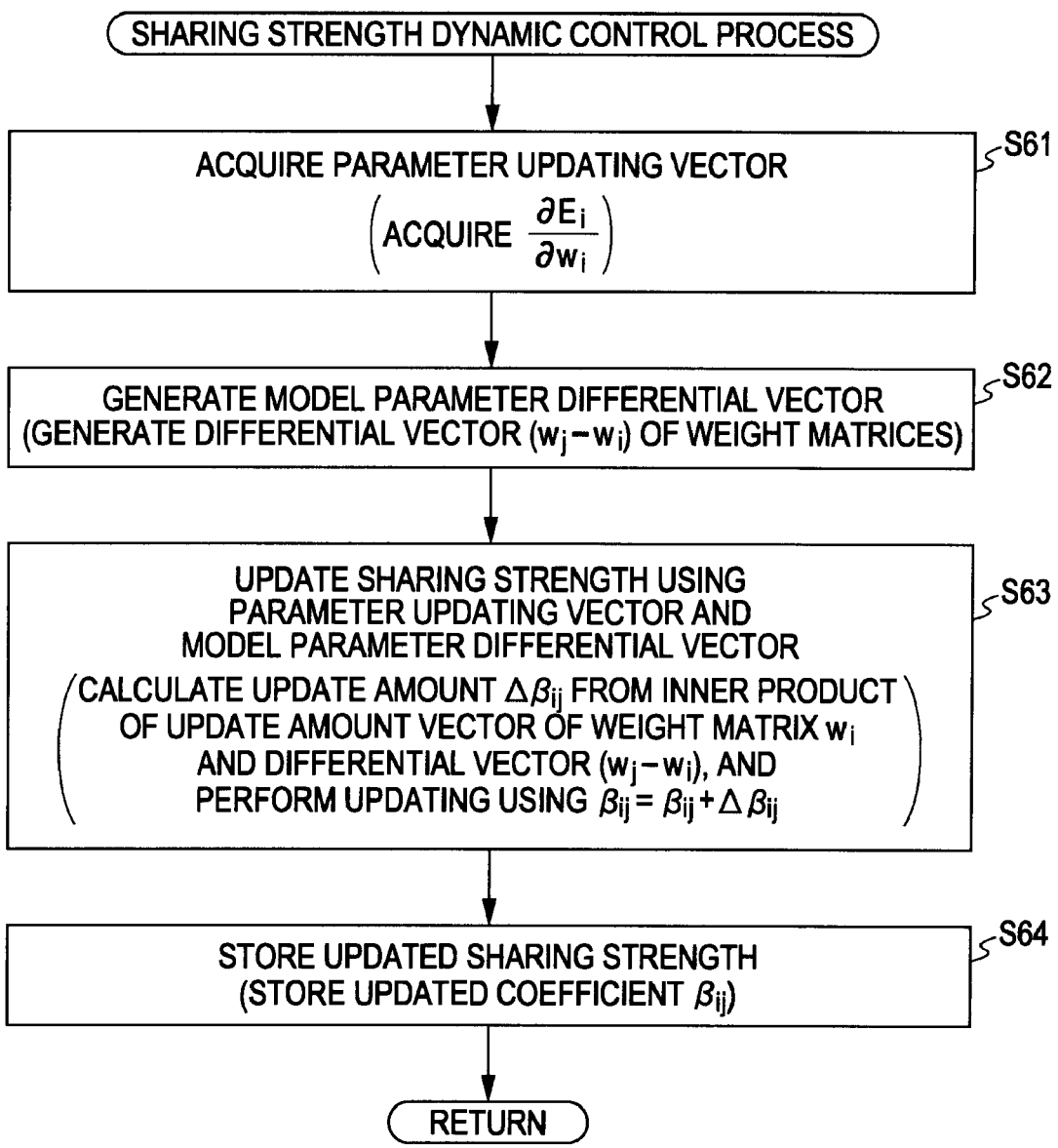
FIG. 15 is a flowchart that illustrates a sharing strength dynamic control process.

FIG. 15 shows a detailed flowchart of the sharing strength dynamic control process in step S44 of FIG. 14.

Initially, in step S61, the parameter updating vector acquisition unit 121 acquires a parameter updating vector at the time of learning of the learning module $10_i$ (an update amount vector at the time of updating model parameters of the learning module $10_i$). In the pattern learning model that employs an RNN, the parameter updating vector acquisition unit 121 acquires $\partial E_i/\partial w_i$ in equation (7), obtained in a process of BPTT for updating the weight matrix $w_i$ in step S43.

In step S62, the parameter differential vector generating unit 122 acquires the model parameters of the learning module $10_i$ and the model parameters of the learning module $10_j$ from the pattern learning unit 111, and generates a model parameter differential vector that is obtained by subtracting the model parameters of the learning module $10_i$ from the model parameters of the learning module $10_j$. In the pattern learning model that employs an RNN, the parameter differential vector generating unit 122 acquires the weight matrix $w_i$ and the weight matrix $w_j$ from the pattern learning unit 111, and generates a differential vector $(w_j-w_i)$ that is obtained by subtracting the weight matrix $w_i$ from the weight matrix $w_j$.

In step S63, the sharing strength updating unit 123 updates the sharing strength using the parameter updating vector acquired by the parameter updating vector acquisition unit 121 and the model parameter differential vector generated by the parameter differential vector generating unit 122. In the pattern learning model that employs an RNN, the sharing strength updating unit 123 obtains an update amount $\Delta\beta_{ij}$ through the inner product of the update amount vector of the weight matrix $w_i$ and the differential vector $(w_j-w_i)$ obtained by subtracting the weight matrix $w_i$ from the weight matrix $w_j$ and then obtains an updated coefficient $\beta_{ij}$ using equation (4).

In step S64, the sharing strength updating unit 123 causes the sharing strength storage unit 124 to store the updated sharing strength for updating the sharing strength next time. In the pattern learning model that employs an RNN, the sharing strength updating unit 123 supplies the updated coefficient $\beta_{ij}$ to the sharing strength storage unit 124 and then causes the sharing strength storage unit 124 to store the updated coefficient $\beta_{ij}$.

The above described processes are performed in step S44 of FIG. 14 as the sharing strength dynamic control process.

Next, the results of an experiment that examines the sharing strength dynamic control process performed by the learning device 101 shown in FIG. 12 will be described with reference to FIG. 16 to FIG. 21C.

Figure 16:
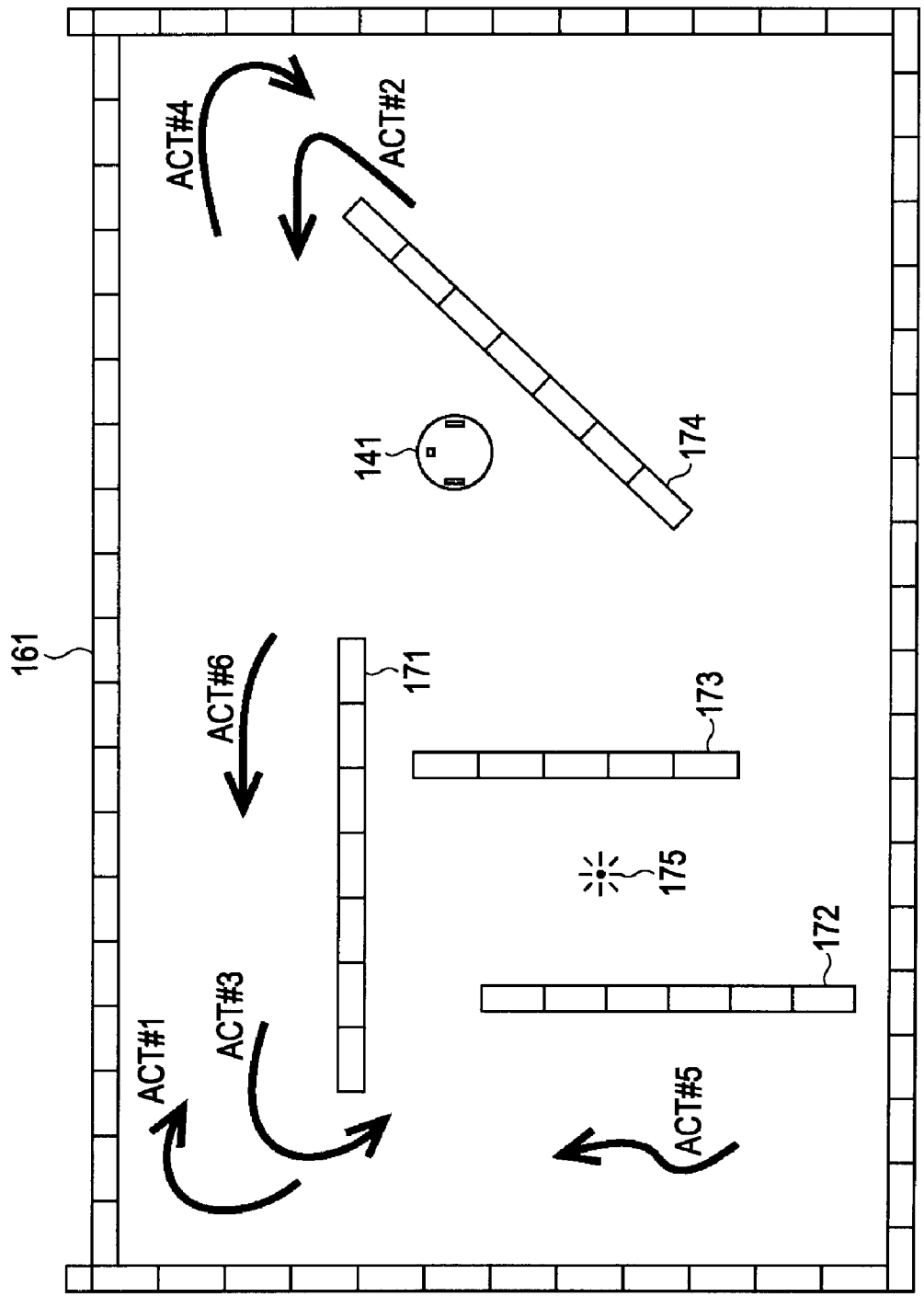
FIG. 16 is a view that illustrates an environment under which an experiment was conducted.

FIG. 16 shows an environment under which the experiment was conducted.

The inventors conducted the experiment that a mobile robot 141 equipped with the learning device 101 shown in FIG. 12 is caused to learn movement on the two-dimensional plane as an action pattern. Note that the RNN in which three contexts are fed back to the input layer was employed as the pattern learning model.

Specifically, the inventors placed the mobile robot 141 in a space (room) 161 surrounded by four side walls, as shown in FIG. 16, and caused each RNN of the mobile robot 141 to learn six action patterns ACT#1 to ACT#6 for moving in the space 161. Note that barriers 171 to 174 and a light 175 are provided in the space 161. In addition, in addition to the six action patterns ACT#1 to ACT#6, reflex actions, such as avoiding a wall (barrier) and approaching the light, are input to (learned by) the mobile robot 141 in advance.

Figure 17:
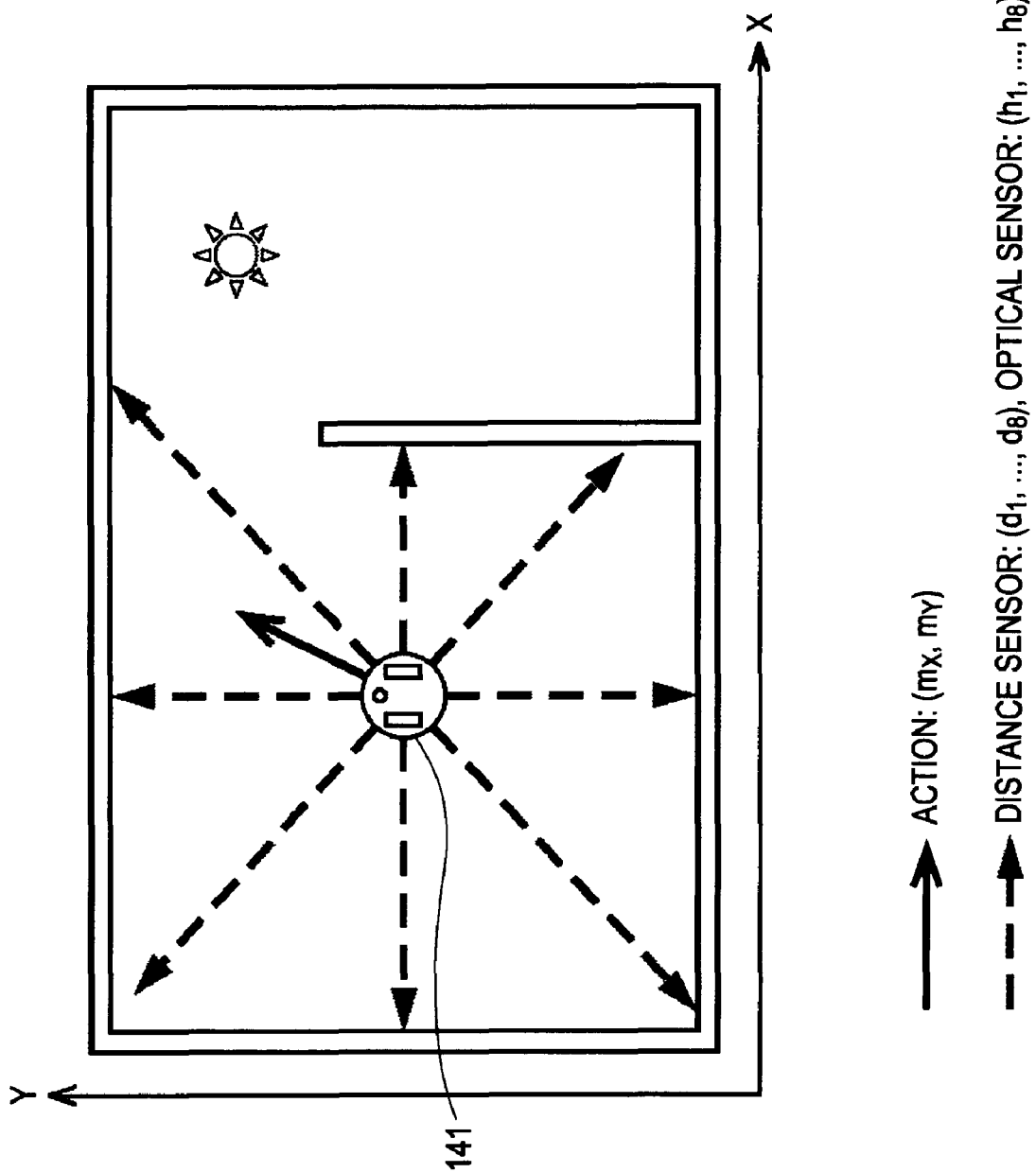
FIG. 17 is a view that illustrates a mobile robot.

The mobile robot 141 includes a distance sensor and an optical sensor. More specifically, as shown in FIG. 17, the mobile robot 141 includes a distance sensor and optical sensor that detect a distance or light in eight detecting directions (directions indicated by the dotted lines), which are obtained by equally dividing 360 degrees around the mobile robot 141 on a predetermined plane parallel to a two-dimensional plane (XY-plane). Input values of the distance sensor in the eight directions are $d_1$ to $d_8$, and input values of the optical sensor in the eight directions are $h_1$ to $h_8$.

Then, to cause the mobile robot 141 to learn action patterns means not to cause the mobile robot 141 to learn a trajectory on the two-dimensional plane (locus of a position) but to cause the mobile robot 141 to learn sensor input values acquired by the sensors and time-series data of an output value of a driving unit of the mobile robot 141 when the mobile robot 141 passes each trajectory.

Thus, in the experiment, the mobile robot 141 learned an 18-dimensional $(m_x, m_y, d_1, \ldots, d_8, h_1, \ldots, h_8)$ vector pattern (time-series data) formed of the input values $d_1$ to $d_8$ of the distance sensor, the input values $h_1$ to $h_8$ of the optical sensor and a movement vector $(m_x, m_y)$ corresponding to a predetermined motor output.

Note that the inventors caused the mobile robot 141 to learn five variations, each of which is slightly different in trajectory, for each of the six action patterns ACT#1 to ACT#6, so the number of samples of the learned action patterns is 30 (six action patterns×five variations) in total.

Figure 18:
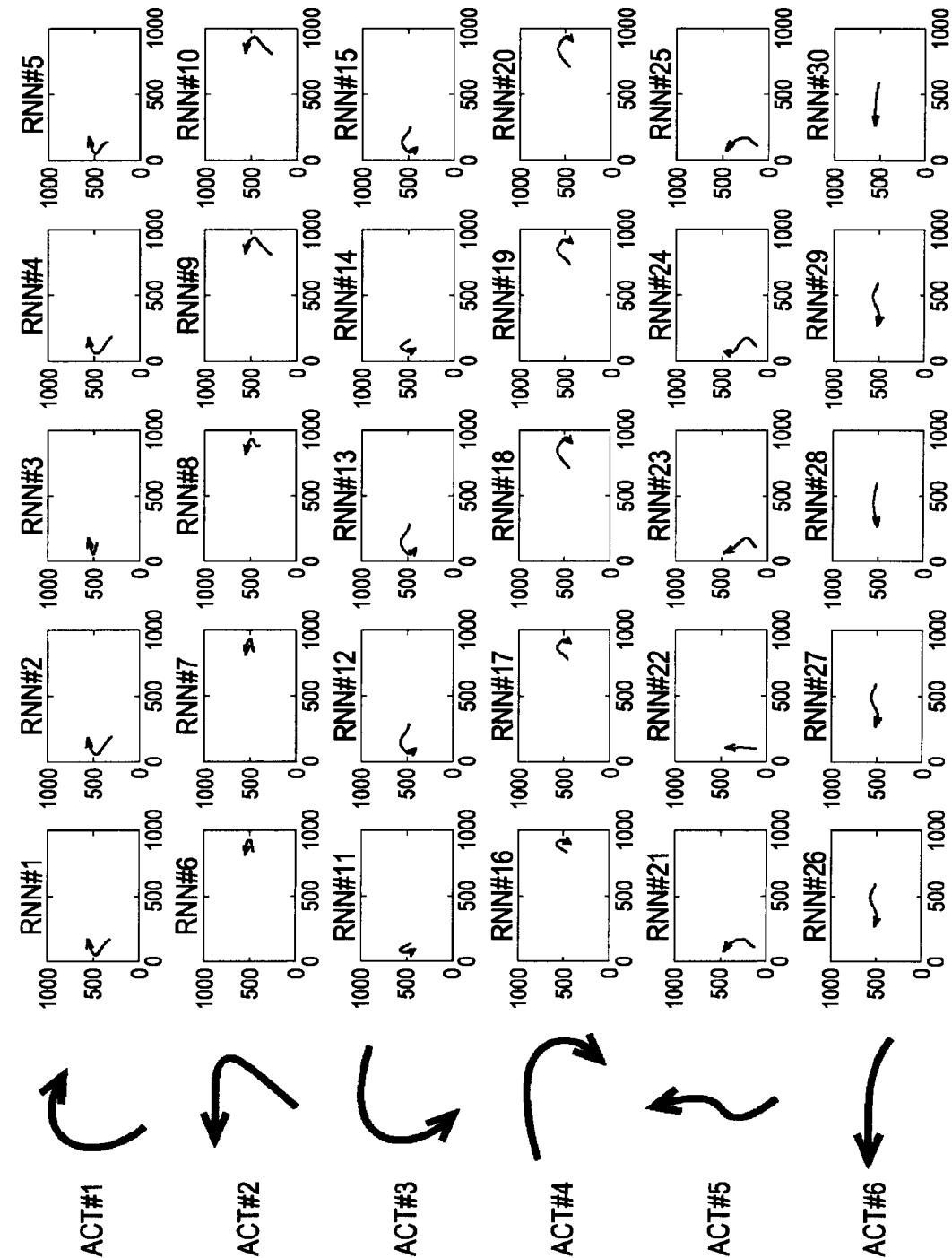
FIG. 18 is a view that shows action patterns used for causing the learning device shown in FIG. 12 to learn.

FIG. 18 shows the action patterns ACT#1 to ACT#6 about which 30 RNN#1 to RNN#30 are caused to learn.

As shown in FIG. 18, the inventors caused the RNN#1 to the RNN#5 to learn five variations of the action pattern ACT#1, caused the RNN#6 to the RNN#10 to learn five variations of the action pattern ACT#2, caused the RNN#11 to the RNN#15 to learn five variations of the action pattern ACT#3, caused the RNN#16 to the RNN#20 to learn five variations of the action pattern ACT#4, caused the RNN#21 to the RNN#25 to learn five variations of the action pattern ACT#5, and caused the RNN#26 to the RNN#30 to learn five variations of the action pattern ACT#6.

Figure 19A:
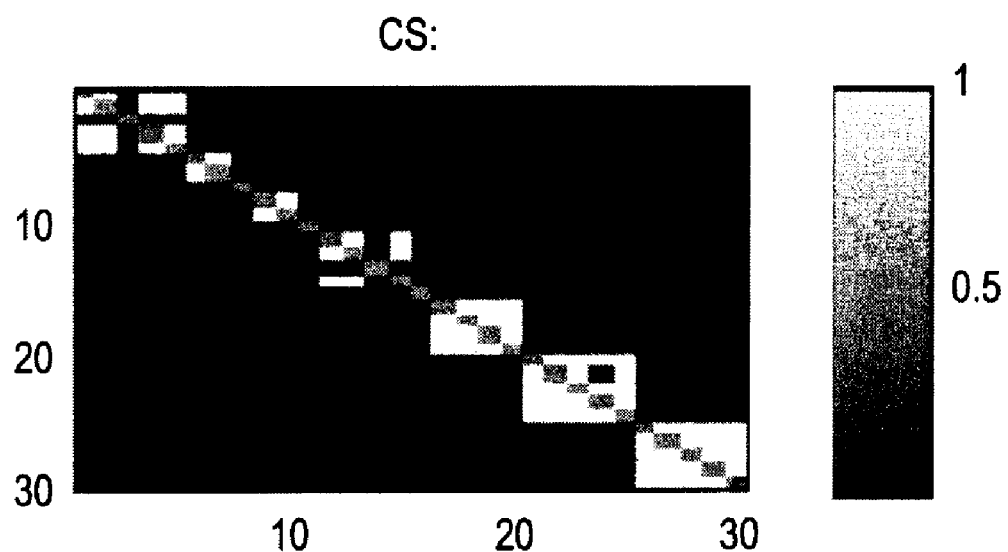
FIG. 19A and FIG. 19B are views that show sharing strengths and weight distances after the learning process.
Figure 19B:
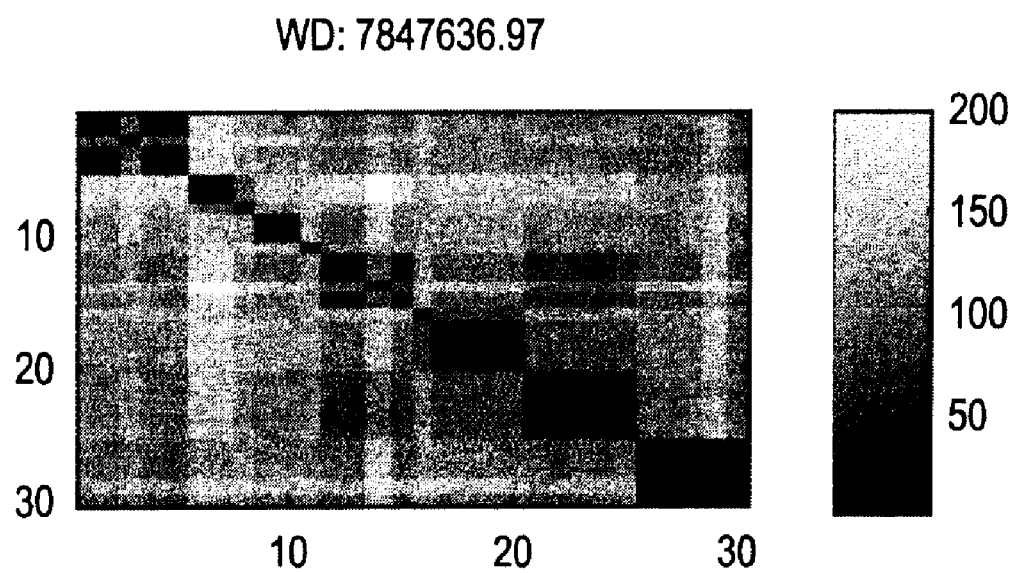

FIG. 19A and FIG. 19B are views that show sharing strengths and weight distances in dark and light among the learning modules (RNNs) after the learning process including the sharing strength dynamic control process.

FIG. 19A shows sharing strengths in dark and light among the learned learning modules (RNNs). The abscissa axis and ordinate axis of FIG. 19A each represent 30 RNN#1 to RNN#30. In FIG. 19A, the coefficient $\beta_{ij}$, which is the sharing strength of the weight matrix $w_j$ of the RNN#j at the ordinate axis with respect to the weight matrix $w_i$ of the RNN#i at the abscissa axis, is shown in dark and light, and the dark and light indicates that, within the range larger than 0.0 and smaller than 1.0, the sharing strength is stronger (coefficient $\beta_{ij}$ is larger) as it is lighter (white), and the sharing strength is weaker (coefficient $\beta_{ij}$ is smaller) as it is darker (black).

In FIG. 19A, the sharing strengths between several RNNs with respect to a diagonal line, which is a line of the sharing strengths between the same weight matrices, are strong, and the sharing strengths with RNNs other than those are weak. This indicates that it is controlled (updated) so as to strengthen the sharing strengths among the learning modules (RNNs) learning the same action pattern by the sharing strength dynamic control process. That is, FIG. 19A indicates that sharing strengths are appropriately set by the dynamic control.

On the other hand, FIG. 19B shows weight distances in dark and light among the learned learning modules (RNNs).

The weight distance is a Euclidean distance between the weight matrices of two RNNs. For example, when the weights of the weight matrix $w_1$ of the RNN#1 are $w_{1,k,l}$ ($1 \leq k \leq Q$, $1 \leq l \leq R$), and the weights of the weight matrix $w_2$ of the RNN#2 are $w_{2,k,l}$, a weight distance $D_{weight}(1,2)$ between the RNN#1 and the RNN#2 may be expressed by equation (8).

$$D_{weight}(1, 2) = \sqrt{\sum_{k=1}^{Q} \sum_{l=1}^{R} (w_{1,k,l} - w_{2,k,l})^2} \quad (8)$$

The abscissa axis and ordinate axis of FIG. 19B each represent 30 RNN#L to RNN#30. In FIG. 19B, the weight distance $D_{weight}(i, j)$ between the RNN#i at the abscissa axis and the RNN#j at the ordinate axis is shown in dark and light, and the dark and light indicates that, within the range larger than 0.0 and smaller than 200.0, the weight distance is smaller as it is darker (black), and the weight distance is larger as it is lighter (white).

In FIG. 19B, the weight distances among several RNNs with respect to a diagonal line, which is a line of the weight distances between the same weight matrices, are small, and the weight distances between the RNNs other than those are large. This indicates that it is controlled (updated) so as to reduce the weight distances among the learning modules learning the same action pattern by the sharing strength dynamic control process. That is, FIG. 19B also indicates that sharing strengths are appropriately set by the dynamic control.

Figure 20:
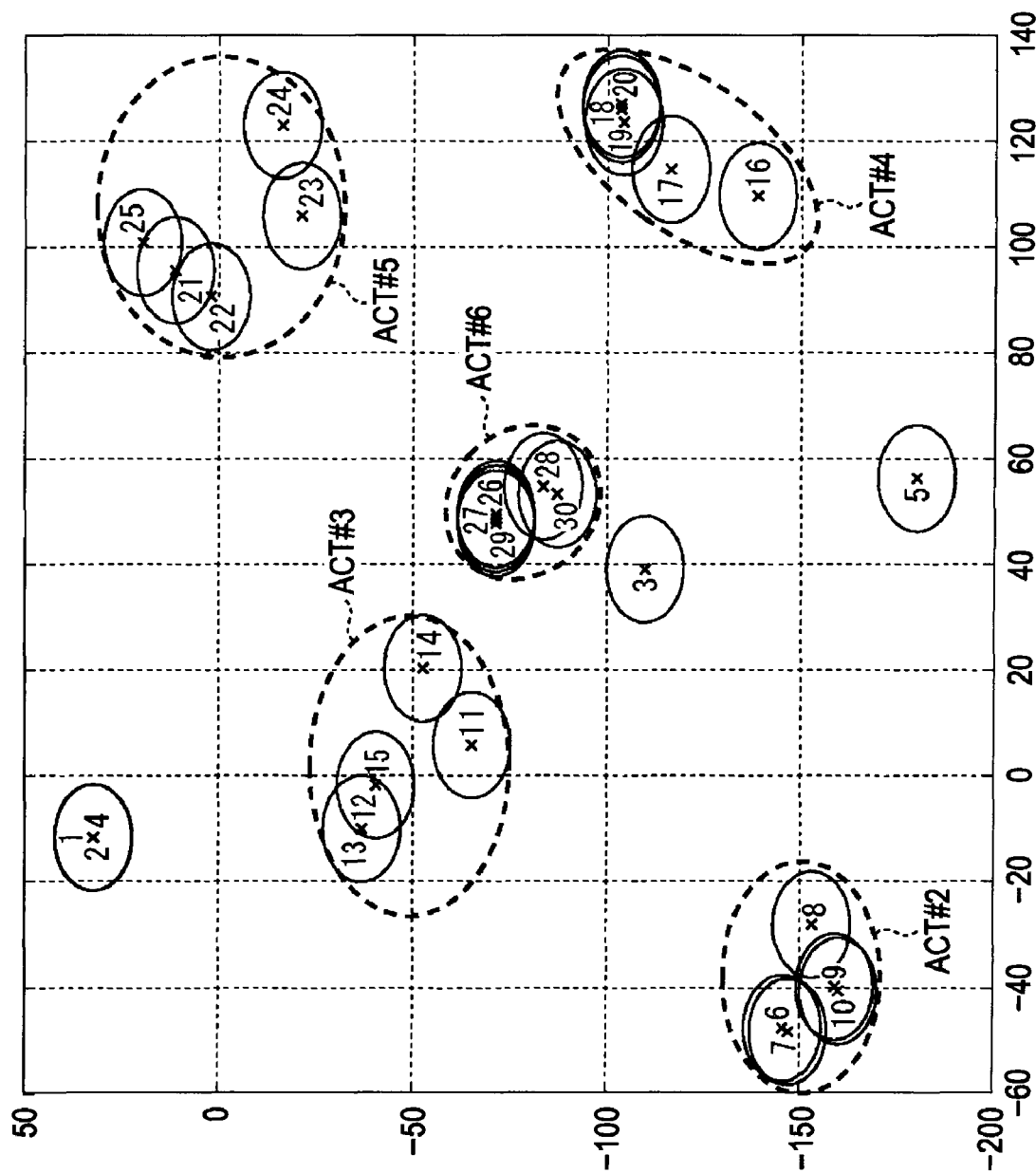
FIG. 20 is a view that shows a sammon map in which weight distances among RNNs after the learning process are projected onto a two-dimensional space.

FIG. 20 shows a sammon map in which the weight distances among the RNNs after learning process including the sharing strength dynamic control process are projected on a two-dimensional space.

The sammon map is a method that allows an n-dimensional input vector to be mapped onto a two-dimensional plane while maintaining relationships in the input vector space, and the detail of the sammon map is disclosed in JOHN W. SAMMON. JR., A Nonlinear Mapping For Data Structure Analysis, IEEE TRANSACTIONS ON COMPUTERS, VOL. C-18, No. 5, MAY 1969.

In FIG. 20, cross-out marks (x) suffixed with number indicate a position of the RNN#i corresponding to that number i on the sammon map. Then, a distance between cross-out marks reflects the weight distance between RNNs. Note that narrow-line circles surrounding cross-out marks each indicate a range in which the weight distance is 10 in order to easily recognize how much the weight distance between RNNs is close (overlap between RNNs).

In addition, in FIG. 20, groups of learning modules (RNNs) that have learned the learning data of any one of the same action patterns ACT#2 to ACT#6 are shown by the wide dotted circle. Thus, it is found that, except the action pattern ACT#1, the weight distances are small (fall within a predetermined range) among the learning modules that have learned similar pieces of learning data (learning samples).

Thus, according to the sharing strength dynamic control process, the state in which the weight distances are small (commonization) is maintained among the learning modules that have learned similar pieces of learning data (learning samples) while the state in which the weight distances are large among the learning modules that have learned dissimilar pieces of learning samples may be maintained. That is, it is found that it is possible to attain both scalability and generalization capability even through the sharing strength dynamic control process.

Figure 21A:
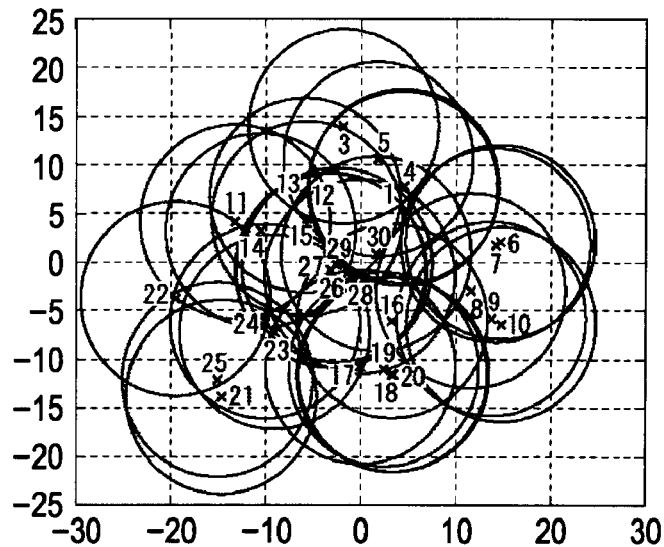
FIG. 21A to FIG. 21C are views that respectively show sammon maps after the learning process when the sharing strengths are fixed values.
Figure 21B:
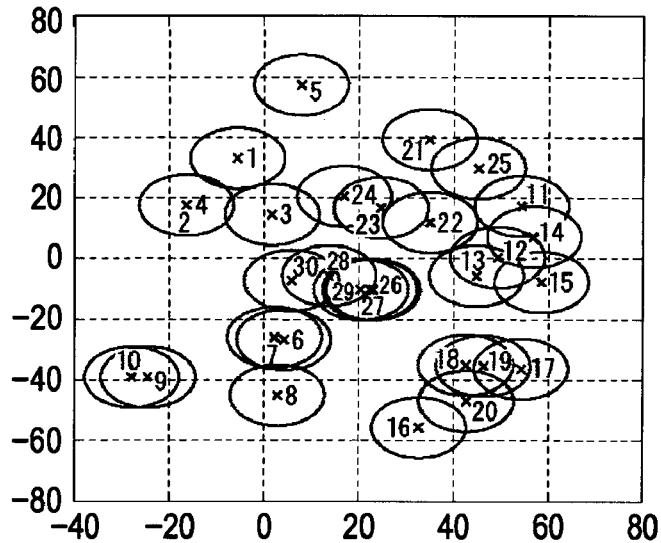
Figure 21C:
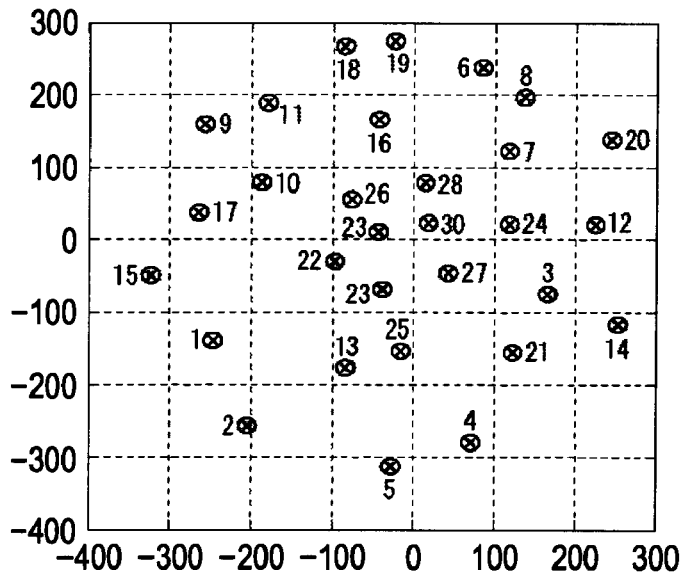

For comparison, FIG. 21A to FIG. 21C each show a sammon map when learning process is performed when the coefficient $\beta_{ij}$ of all 30 RNN#1 to RNN#30 is any one of fixed values of 0.3, 0.1, and 0.01 ($\beta_{ij}=0.3$, $\beta_{ij}=0.1$, $\beta_{ij}=0.01$).

FIG. 21A shows the case where the coefficient $\beta_{ij}$ is a fixed value of 0.3 ($\beta_{ij}=0.3$), FIG. 21B shows the case where the coefficient $\beta_{ij}$ is a fixed value of 0.1 ($\beta_{ij}$=0.1), and FIG. 21C shows the case where the coefficient $\beta_{ij}$ is a fixed value of 0.01 ($\beta_{ij}$=0.01).

Note that FIG. 20 differs in indicating range from FIG. 21A to FIG. 21C, so the scales of the ordinate axis and abscissa axis are different between FIG. 20 and FIG. 21A to FIG. 21C. However, narrow-line circles indicating the range in which the weight distance is 10 apply to both FIG. 20 and FIG. 21A to FIG. 21C.

According to FIG. 21A to FIG. 21C, for example, as shown in FIG. 21C, when the sharing strength is small, each RNN is located so as to be independent of any of the other RNNs (becomes a state where the weight distances are large); on the contrary, as shown in FIG. 21A, when the sharing strength is large, each RNN is located so as to be commonized with any of the other RNNs (becomes a state where the weight distances are small). FIG. 21B shows a distribution that is intermediate between FIG. 21A and FIG. 21C.

In addition, referring to FIG. 21B, there is a low tendency in position that the weight distances are small among the learning modules that have learned similar pieces of learning data (learning samples) and the weight distances are large among the learning modules that have learned dissimilar learning samples.

Thus, when comparing FIG. 20 with FIG. 21A to FIG. 21C, the learning device 101 shown in FIG. 12 is able to set strong sharing strengths for the learning modules that have learned similar patterns and set weak sharing strengths for the learning modules that have learned dissimilar patterns while achieving both scalability and generalization capability.

As described above, according to the learning device 101, the sharing strengths among the learning modules may be optimally (automatically) set even when a user does not determine and set the sharing strengths.

The above described series of processes may be implemented by hardware or may be implemented by software. When the series of processes are executed by software, a program that constitutes the software is installed onto a general-purpose computer, or the like.

Figure 22:
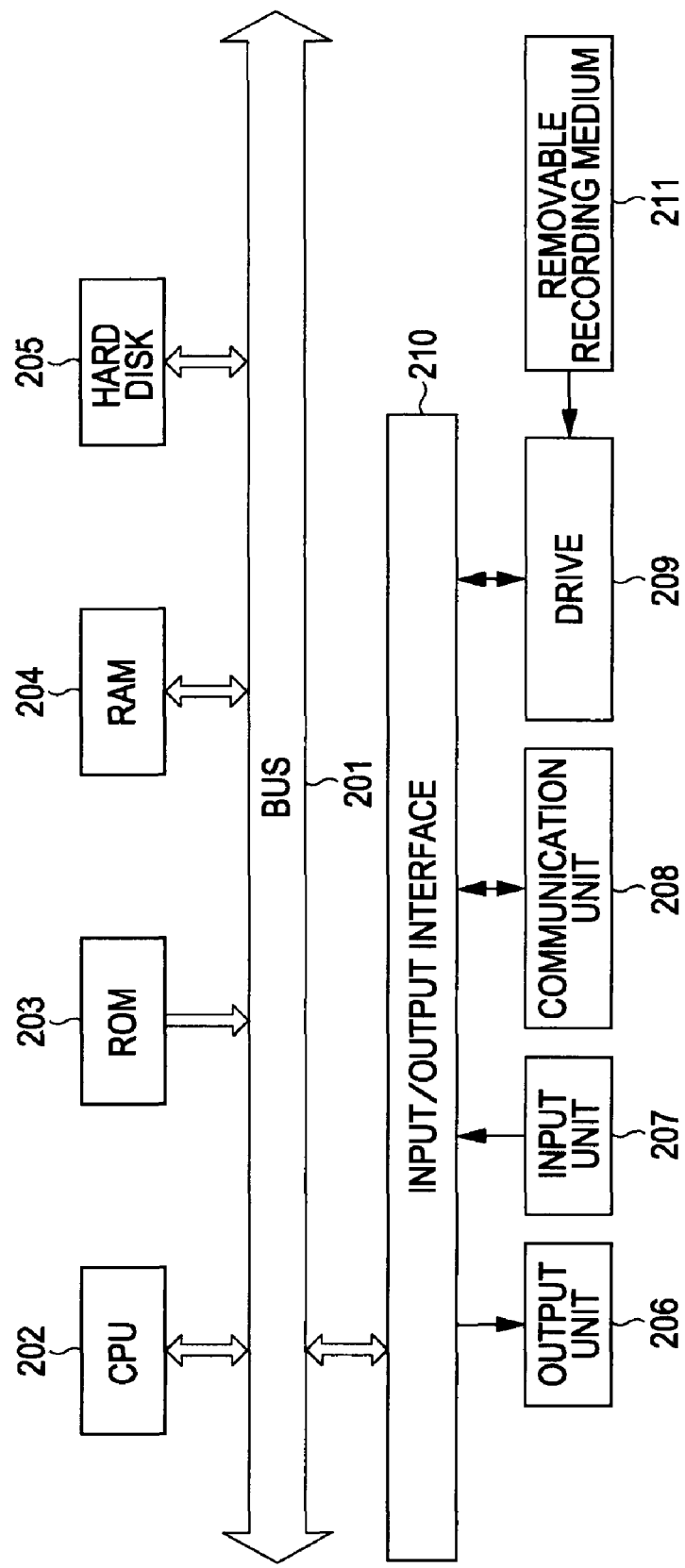
FIG. 22 is a block diagram that shows a configuration example of a computer according to an embodiment of the invention.

Then, FIG. 22 shows a configuration example of one embodiment of a computer to which a program that executes the above described series of processes are installed.

The program may be recorded in advance in a hard disk 205 or a ROM 203, which serves as a recording medium, provided in the computer.

Alternatively, the program may be temporarily or permanently stored (recorded) in a removable recording medium 211, such as a flexible disk, a CD-ROM (Compact Disc Read Only Memory), a MO (Magneto Optical) disk, a DVD (Digital Versatile Disc), a magnetic disk, and a semiconductor memory. The above removable recording medium 211 may be provided as a so-called packaged software.

Note that the program may be not only installed from the above described removable recording medium 211 onto the computer, but also transferred from a download site through a satellite for digital satellite broadcasting onto the computer by wireless communication or transferred through a network, such as a LAN (Local Area Network) and the Internet, onto the computer by wired communication, and the computer may receive the program transferred in that way by a communication unit 208 to install the program onto the internal hard disk 205.

The computer includes a CPU (Central Processing Unit) 202. An input/output interface 210 is connected to the CPU 202 via a bus 201. As a command is input through an input unit 207, formed of a keyboard, a mouse, a microphone, or the like, operated by the user through the input/output interface 210, the CPU 202 executes the program stored in the ROM (Read Only Memory) 203 in accordance with the user's operation. Alternatively, the CPU 202 loads the program stored in the hard disk 205, the program transferred from a satellite or a network, received by the communication unit 208 and then installed onto the hard disk 205, or the program read from the removable recording medium 211 mounted on the drive 209 and then installed onto the hard disk 205, onto the RAM (Random Access Memory) 204 and then executes the program. Thus, the CPU 202 performs the process in accordance with the above described flowchart or performs the process performed by the configuration shown in the above described block diagram. Then, the CPU 202, where necessary, outputs the processing result from an output unit 206 formed of, for example, an LCD (Liquid Crystal Display), a speaker, or the like, through the input/output interface 210, or transmits the processing result from the communication unit 208, and then records the processing result in the hard disk 205.

Here, in the specification, process steps that describe a program for causing the computer to execute various processings are not necessarily processed in time sequence in the order described as the flowchart, but also include processes that are executed in parallel or separately (for example, parallel process or process using an object).

In addition, the program may be processed by a single computer or may undergo distributed processing by a plurality of computers. Furthermore, the program may be transferred to a remote computer and then executed.

Note that, the embodiment of the invention is not limited to the above described embodiment and may be modified into various forms without departing from the scope of the invention.

That is, the embodiment of the invention is not a method specialized to a certain specific space pattern and a time-series sequence and pattern. Thus, the embodiment of the invention may be applied to prediction or classification of a pattern on the basis of learning and learned results of a user input through a user interface of a computer, a pattern of a sensor input and motor output of a robot, a pattern related to music data, a pattern related to image data, and a pattern of a phoneme, a word, a sentence, and the like, in language processing.

The present application contains subject matter related to that disclosed in Japanese Priority Patent Application JP 2008-178805 filed in the Japan Patent Office on Jul. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A learning device comprising:
   a processor having:
      a plurality of learning modules, each of which performs update learning to update a plurality of model parameters of a pattern learning model that learns a pattern using input data;
      model parameter sharing unit causing two or more learning modules from among the plurality of learning modules to share the model parameters; and
      sharing strength updating unit sharing strengths between the learning modules so as to minimize learning errors when the plurality of model parameters are updated by the update learning, wherein the model parameter sharing unit corrects the model parameters updated by each of the two or more learning modules using a weight average value of the model parameters updated respectively by the two or more learning modules to thereby cause the two or more learning modules to share the model parameters updated respectively by the two or more learning modules.

2. The learning device according to claim 1, wherein, when the sharing strength updating unit updates the sharing strength that indicates a strength of influence from a first learning module to a second learning module from among the plurality of learning modules, the sharing strength updating unit updates the sharing strength using the inner product of a parameter updating vector when the second learning module learns and a model parameter differential vector obtained by subtracting the model parameters of the second learning module from the model parameters of the second learning module from the model parameters of the first learning module.

3. The learning device according to claim 1, wherein the pattern learning model is a model that learns a time-series pattern or dynamics.

4. The learning device according to claim 1, wherein the pattern learning model is an HMM, an RNN, an FNN, an SVR or an RNNPB.

5. The learning device according to claim 1, wherein the model parameter sharing unit causes all or a portion of the plurality of learning modules to share the model parameters.

6. The learning device according to claim 1, wherein the model parameter sharing unit causes two or more learning modules from among the plurality of learning modules to share all or a portion of the plurality of model parameters.

7. A learning method comprising the steps of:
performing update learning to update a plurality of model parameters of a pattern learning model that learns a pattern using input data in each of a plurality of learning modules;
causing two or more learning modules from among the plurality of learning modules to share the model parameters; and
updating sharing strengths between the learning modules so as to minimize learning errors when the plurality of model parameters are updated by the update learning,
correcting the model parameters updated by each of the two or more learning modules using a weight average value of the model parameters updated respectively by the two or more learning modules to thereby cause the two or more learning modules to share the model parameters updated respectively by the two or more learning modules.

8. A non-transitory program recording medium having a program recorded therein to be computer-readable, the program comprising the steps of:
performing update learning to update a plurality of modules parameters of a pattern learning model that learns a pattern using input data in each of a plurality of modules;
causing, by a model parameter sharing unit, two or more learning modules from among the plurality of learning modules to share the model to share the model parameters; and
updating sharing strengths between the learning modules so as to minimize learning errors when the plurality of model parameters are updated by the update learning,
wherein the model parameter sharing unit corrects the model parameters updated by each of the two or more learning modules using a weight average value of the model parameters updated respectively by the two or more learning modules to thereby cause the two or more learning modules to share the model parameters updated respectively by the two or more learning modules.

* * * * *